US008641323B2

(12) United States Patent
Tame

(10) Patent No.: US 8,641,323 B2
(45) Date of Patent: Feb. 4, 2014

(54) METHOD AND APPARATUS FOR AT SEA PIPE ABANDONMENT AND RECOVERY

(75) Inventor: Jonathan Richard Tame, Banchory (GB)

(73) Assignee: Subsea 7 Limited, Westhill (GB)

( * ) Notice: Subject to any disclaimer, the term of this patent is extended or adjusted under 35 U.S.C. 154(b) by 224 days.

(21) Appl. No.: 13/062,928

(22) PCT Filed: Sep. 1, 2009

(86) PCT No.: PCT/EP2009/061258
§ 371 (c)(1),
(2), (4) Date: Jul. 5, 2011

(87) PCT Pub. No.: WO2010/026132
PCT Pub. Date: Mar. 11, 2010

(65) Prior Publication Data
US 2011/0262229 A1    Oct. 27, 2011

(30) Foreign Application Priority Data
Sep. 8, 2008 (GB) .................................. 0816390.9

(51) Int. Cl.
*F16L 1/12* (2006.01)
*F16L 27/00* (2006.01)

(52) U.S. Cl.
USPC ........ 405/166; 405/154.1; 405/158; 405/173; 405/177; 405/184.4

(58) Field of Classification Search
USPC ........... 405/154.1, 158, 166, 167, 168.3, 170, 405/173, 177, 184.4
See application file for complete search history.

(56) References Cited

U.S. PATENT DOCUMENTS 4,073,157 A     2/1978 Aylmer et al.
6,149,347 A  * 11/2000 Scott ............................ 405/167
(Continued)

FOREIGN PATENT DOCUMENTS

EP    1850043    10/2007
GB    1546576     5/1979
(Continued)

OTHER PUBLICATIONS

International Searching Authority/European Patent Office, "Notification of Transmittal of the International Search Report and the Written Opinion of the International Searching Authority, or the Declaration," for PCT/EP2009/061258, mailed Jun. 9, 2010, 14 pages.

(Continued)

*Primary Examiner* — David Bagnell
*Assistant Examiner* — Carib Oquendo
(74) *Attorney, Agent, or Firm* — Levy & Grandinetti

(57) ABSTRACT

A method of positioning on the sea floor, from a floating vessel, an unlaid end portion of a pipe that is being laid from its other end on the sea floor is disclosed. The method includes lowering the unlaid end portion of the pipe to a lowered position above the sea floor. Transfer of the load of the unlaid end portion of the pipe occurs from the lowering device to a line for suspending the unlaid end portion of the pipe. Lowering the line for suspending and the unlaid end portion of the pipe occurs. There is disclosed a corresponding method of recovery as well as associated apparatus. A method for effecting a subsea connection between one line and an object suspended below the surface of the sea by another line and associated apparatus are disclosed.

32 Claims, 14 Drawing Sheets

(56) References Cited

U.S. PATENT DOCUMENTS

2003/0099515 A1    5/2003    Giovannini et al.
2005/0169713 A1    8/2005    Luc et al.
2007/0177944 A1*  8/2007    Smith et al. .................. 405/169
2007/0248418 A1  10/2007   Steenhuis et al.

FOREIGN PATENT DOCUMENTS

| | | | | |
|---|---|---|---|---|
| GB | 0715549.2 | * | 8/2007 | ................ F16L 1/20 |
| GB | 2434627 | | 8/2007 | |
| GB | 2435316 | | 8/2007 | |
| WO | WO 2008/099109 | | 8/2008 | |

OTHER PUBLICATIONS

Great Britain Intellectual Property Office, Search Report issued Nov. 27, 2009, Application No. GB0816390.9, 2 pgs.
Great Britain Intellectual Property Office, Search Report issued Nov. 26, 2009, Application No. GB0816390.9, 1 pg.
Great Britain Intellectual Property Office, Search Report issued Jan. 8, 2009, Application No. GB0816390.9, 1 pg.

* cited by examiner

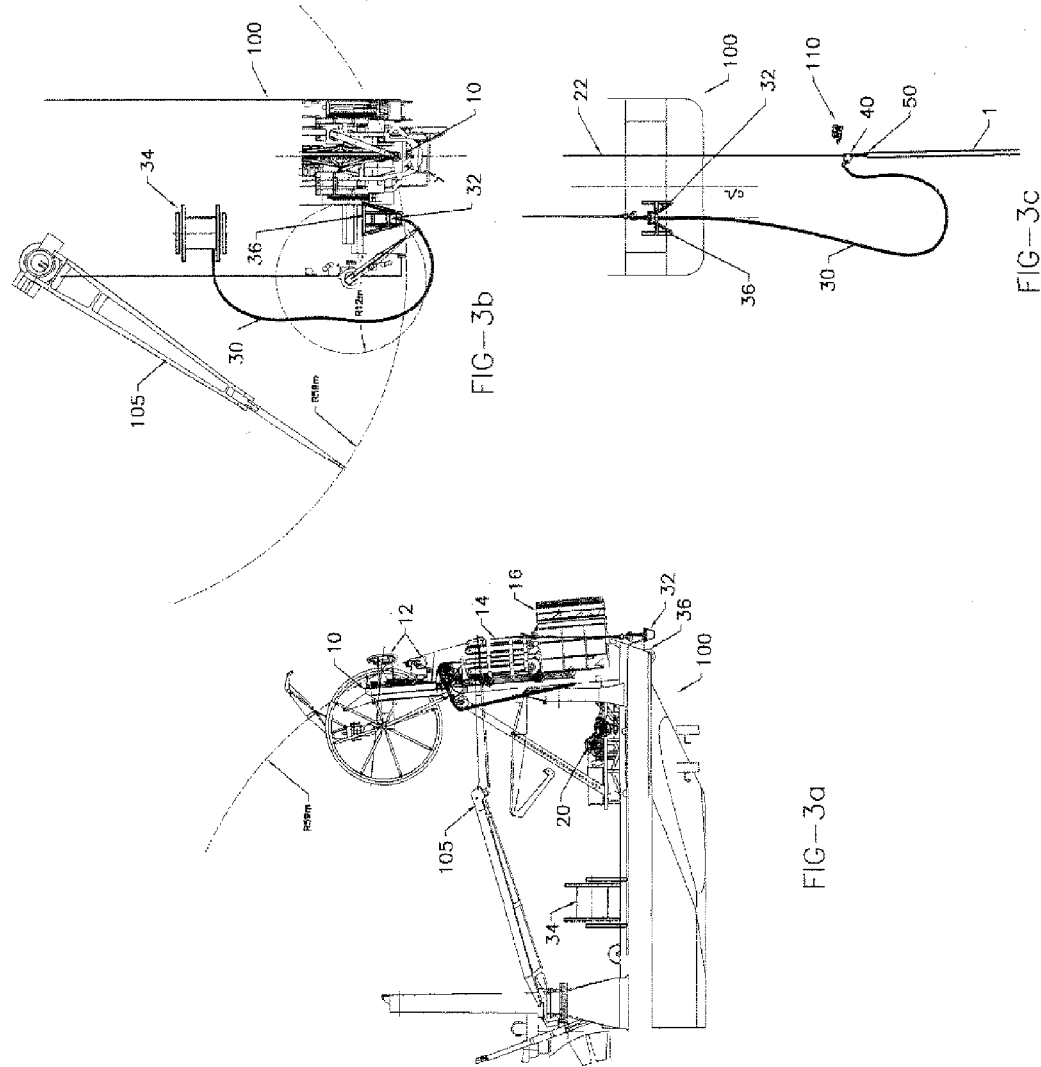

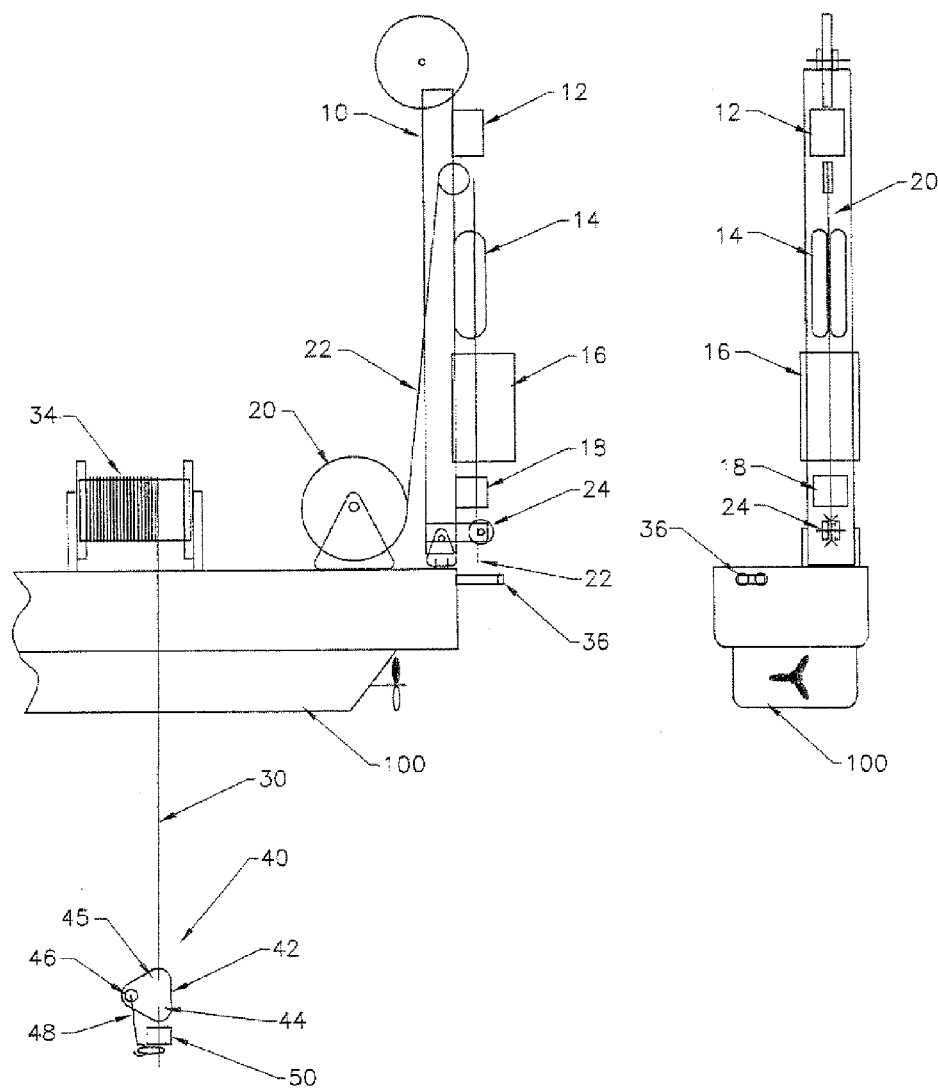

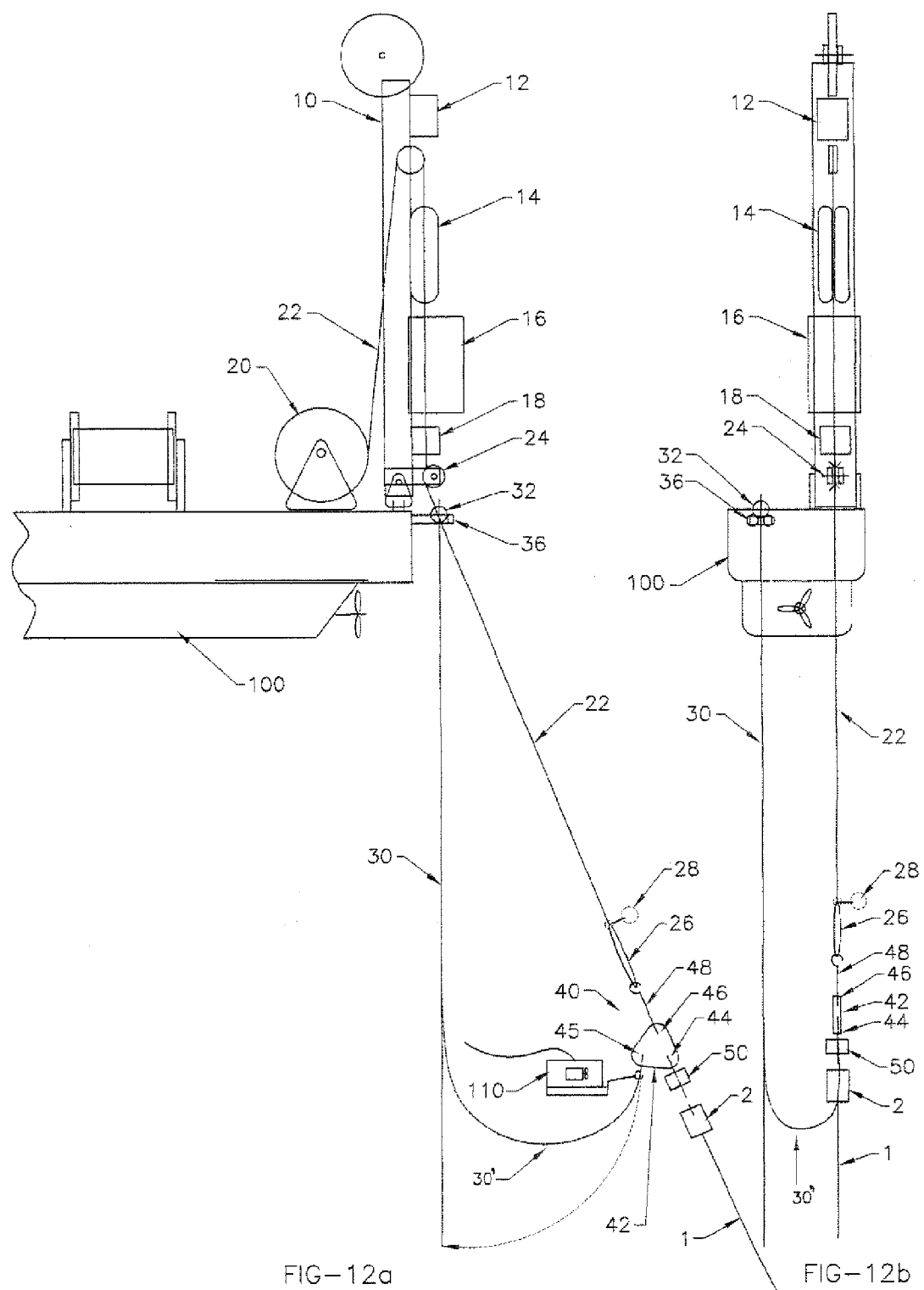

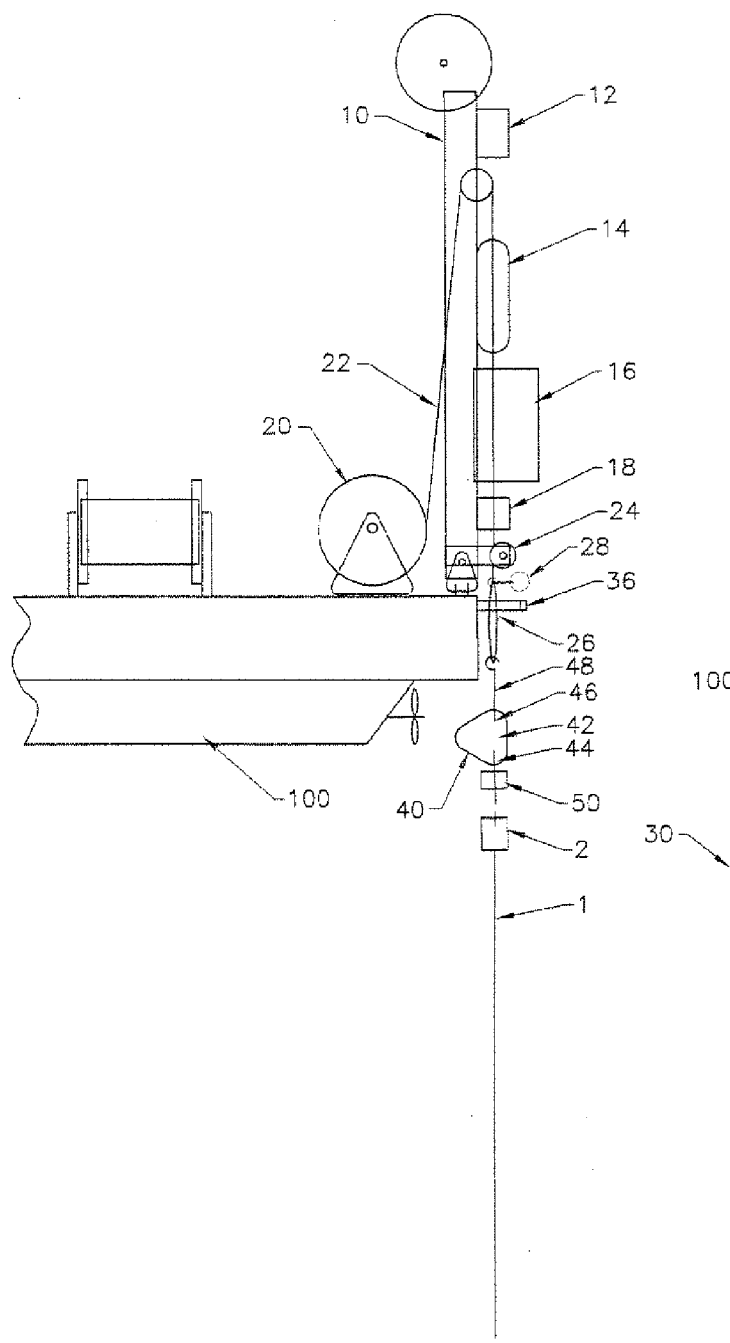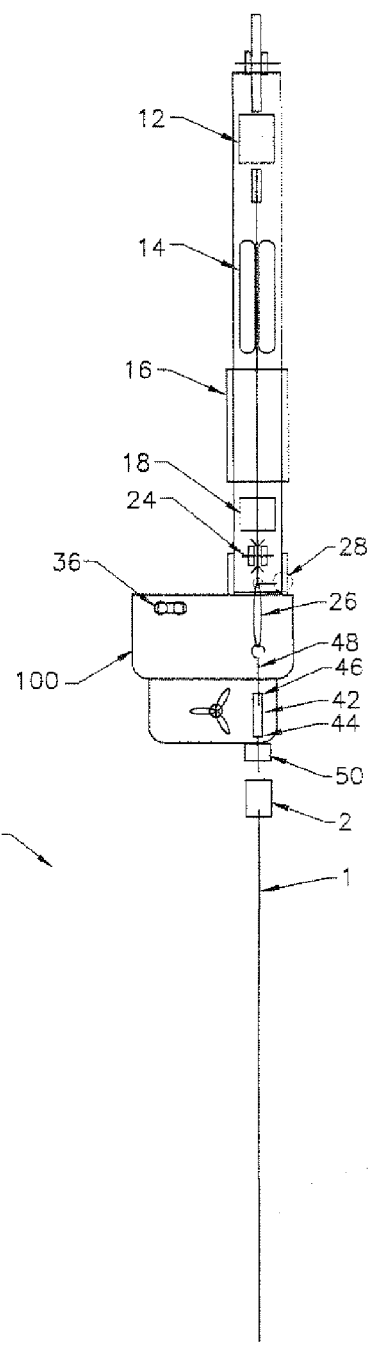
FIG-14a
FIG-14b

METHOD AND APPARATUS FOR AT SEA PIPE ABANDONMENT AND RECOVERY

This application claims priority to and is a national phase application of International Application PCT/EP2009/061258, filed Sep. 1, 2009, which claims priority to GB Application 0816390.9, filed Sep. 8, 2008, both of which are incorporated herein by reference.

This invention relates to a method of positioning on the sea floor, from a floating vessel, an unlaid end portion of a pipe that is being laid on the sea floor; a method of recovering to a floating vessel the end of a pipe lying on the sea floor; apparatus for use in performing such methods of raising and lowering a pipe between the sea floor and a vessel on the surface of the sea; a method for effecting a subsea connection between one line and an object suspended below the surface of the sea by another line; and Apparatus for guiding one line to an object suspended below the surface of the sea for effecting a subsea connection between the one line and the object. The methods and apparatus are particularly useful for lay down, abandonment and recovery of pipes, such as oil conveying pipes, during or at the end of the process of laying such pipes from a pipe laying vessel onto the sea floor.

It is well known to lay pipe on the sea bed (sea floor) for conveying oil, gas and the like between two sites, such as a production well and an adjacent production platform. In order to lay the pipe, a pipe laying vessel is used, which typically discharges the pipe from a pipe storage drum on the vessel down into the sea while the vessel is advancing on the sea surface in the direction of laying of the pipe. As the pipe is fed from the vessel into the sea, down to the sea floor, it will typically adopt a catenary shape between a near-vertical orientation at the vessel and a substantially horizontal orientation on the sea floor. It is also known, however, to lay the pipe in such a manner that it forms a much shallower angle with the vessel at the sea surface, and also in certain cases so as to adopt a more wave-shaped or 3-shaped profile, rather than a catenary profile, between the surface of the sea and the sea floor.

Such pipes are typically designated either as flexible pipe or rigid pipe. Whereas flexible pipe can be fed directly from a storage reel, over a guiding means on the vessel and into the sea, and will thereafter adapt to the desired catenary or other configuration, a rigid pipe must first be straightened after it has been removed from a pipe storage drum, in order to remove the plastic deformation which the (typically metal-walled) rigid pipe has undergone when it was wound onto the drum initially. To provide for such straightening, the rigid pipe may be fed from the storage drum over an arcuate guide or a large diameter wheel the top of a pipe laying ramp. The bottom of the ramp is directed over one side (usually the stern) of the vessel, to direct the pipe into the sea. Various equipment and work stations are located along the ramp, including a straightener or straightening device for removing plastic deformation from the rigid pipe as it is fed down the ramp and into the sea. Flexible pipe may be laid into the sea from the vessel in a similar manner, but does not require a straightening operation. As well as feeding pipe from the vessel into the sea over a side of the vessel, it is also known to lay such pipe through an opening in the deck of the vessel, known as a moon pool.

For various reasons, it is sometimes necessary, during or as a part of pipe laying operations, to lower onto the sea floor the unlaid end of the pipe that is being laid. That is to say, where there is a first end of the pipe which is first fed into the sea and to the sea floor, and a second end of the pipe which is last to be fed from the vessel into the sea, the second end is the unlaid end of the pipe. Lowering the second, unlaid end of the pipe to the sea floor is known as either abandonment or lay down, depending on the circumstances.

Abandonment is lowering the unlaid end of the pipe to the sea floor during an ongoing pipe laying operation, where it is intended subsequently to recover the second, unlaid end of the pipe to the vessel so as to resume the interrupted pipe laying operation. Abandonment is therefore associated with the term "abandonment and recovery", often abbreviated to "A&R". Abandonment and recovery operations may either be scheduled, pre-planned breaks in the pipe laying operation, for example when supplies on the vessel of the pipe to be laid are depleted and must be replenished, or maybe required in response to unforeseen and unpredictable circumstances, such as adverse weather conditions, which require the pipe laying operation to be temporarily halted.

Lay down, by contrast, is the situation where recovery of the pipe end from the sea floor or bed is not intended, because the pipe is to become part of a permanent installation on the sea floor, for example when it is to buried in the sea bed or connected to other subsea equipment. In this case, the second end of the pipe is typically (although not always) fitted with some form of end attachment, such as a collet connector, pipe line end termination (PLET), or pig launcher, for example, prior to being lowered to the sea bed.

As suggested above, recovery is essentially the reverse process to abandonment, whereby the end of a pipe which has been lowered to the sea bed is recovered by raising it all or substantially all of the way back to the vessel on the sea surface.

In order to facilitate lay down and abandonment and recovery operations, a pipe laying vessel is normally provided with an abandonment and recovery (AS-R) winch. The winch is provided with a winch line, which may take the form of wire cable or synthetic rope, and which may be coupled to the second unlaid end of the pipe for lowering or raising the pipe to and from the sea floor. The A&R winch is rated to a given capacity, which is to say that it can operate fully up to a given force limit for raising or lowering the end portion of the pipe. The forces which the winch will need to exert during raising and lowering operations will correspond to the length of the pipe to be raised or lowered, such that the rating or capacity of the A&R winch substantially corresponds no the maximum depth of sea water in which the A&R winch can be used to lower the unlaid end of a pipe to the sea floor or to recover the pipe end from the sea floor to the vessel. For example, if the sea water has a depth of 3,000 meters, the suspended pipe length will weigh about 400 tonnes. Accordingly, the A&R winch has to be rated so as to be capable of abandoning and recovering the unlaid end of a pipe in the depths of sea water in which the pipe laying vessel is intended to be used.

The depth at which the unlaid end of a pipe being laid may be abandoned and recovered is limited, however, not only by the rating or capacity of the A&R winch, but also by the length of the winch line. In order to lower the second unlaid end of the pipe to a depth of 3,000 meters, one of course requires at least 3,000 meters of the relatively large, heavy and very expensive winch wire which has to be used for lowering the pipe to the sea floor. Similarly as for the A&R winch, the A&R winch line also has to be rated for the weight of the end portion of the pipe which will be raised and lowered using the winch line. For the example of a 400 tonne winch, a wire winch line would have a diameter of approximately 114 mm (4.5 inches). 3,000 meters of such wire or cable has an attendant mass of its own, as well as occupying a substantial volume when wound on the A&R winch.

One disadvantage associated with using the A&R winch and winch line for lowering the unlaid end of the pipe being laid to the sea floor is that the entire length of the winch line (a length at least as long as all the way from the vessel to the sea floor) must then be provided at the rating of the A&R winch. Such raising and lowering capacity is not, however, required or utilized for the entire length of the raising or lowering operation. Specifically, the effective weight induced by the pipe end portion being lowered that must be carried by the winch and winch line, during the raising or lowering operation, is greatest nearest the surface of the sea and smallest nearest one sea bed. That is to say, when a full pipe catenary exists between the sea floor and the vessel, the winch and winch line must support the weight of the full height of the catenary, such as 3,000 meters in the example used above. However, once the pipe end portion is lowered towards the sea floor, the weight of the pipe end portion which must be supported by the A&R winch and winch line is reduced. In the above example, once the pipe end portion has been lowered halfway to the sea floor, only 1,500 meters of pipe needs to be supported, which would typically induce only around half of the weight of the full 3,000 meter catenary, which would be around 200 tonnes in the above example. It follows, therefore, that the largest-diameter, maximum capacity winch line is not required for the full raising or lowering operation, but is only needed for the portion carried out nearest to the surface of the sea.

Such a problem has already been addressed in the prior art, for example in GB 2 434 627 A, in which a secondary, lower capacity winch is provided m addition to the A&R winch. The A&R winch is used to lower the end portion of the pipe approximately half of the distance from the sea surface to the sea floor, at which point the loading of the pipe end portion is transferred to the secondary winch, having a lower capacity but a longer winch line, for lowering the pipe end portion the remainder of the distance to the sea floor.

Providing a second separate winch system, in addition to the existing A&R winch and winch line, merely for effecting A&R winching operations, is, however, not the ideal solution in every circumstance. In general, it would be preferable for the A&R winch to have the ability to carry out abandonment and recovery operations from the vessel to the sea floor, without use of a further secondary winch. Nevertheless, one may not wish to provide (and to have to store) a length of winch line corresponding to the full depth of the sea from the vessel to the sea floor when the load capacity of the large, heavy and very expensive winch line is substantially under-utilized for a large portion of the A&R operation.

Moreover, regardless of the length of the winch line with which a pipe laying vessel is equipped, there will always remain the possibility that the pipe laying vessel would be required to perform pipe laying operations in sea water having a depth greater than the length of the A&R winch wire provided.

According to a first aspect of the present invention, there is provided a method of positioning on the sea floor, from a floating vessel, an unlaid end portion of a pipe that is being laid from its other end on the sea floor, comprising the steps of: (i) lowering the unlaid end portion of the pipe from a lowering device on the vessel to a lowered position in the sea above the sea floor; (ii) transferring the load of the unlaid end portion of the pipe from the lowering device to means for suspending the unlaid end portion of the pipe at the lowered position in the sea; and (iii) lowering the means for suspending and the unlaid end portion of the pipe suspended thereby to the sea floor.

In a preferred embodiment, the means for suspending is a line extendible from the vessel and having an extended length substantially the same as the depth of the lowered position. Preferably, the line is extended from the vessel as the unlaid end portion of the pipe is lowered from the lowering device. More preferably, the line is extendible from a location on the vessel laterally spaced from the lowering device. Even more preferably, the line may be coupled to the vessel at one end thereof and coupled to the unlaid end of the pipe being laid at the other end thereof, and the unlaid end of the pipe is suspended at the lowered position from the vessel. More preferably, the line is a pennant wire which may be unspooled from a winch to extend from the vessel.

In another preferred embodiment, the step of lowering the means for suspending and the unlaid end portion of the pipe suspended thereby to the sea floor is performed by the lowering device.

In another preferred embodiment, an end connector is connected to the unlaid end of the pipe being laid by which to couple the lowering device to the unlaid end portion of the pipe for lowering the unlaid end portion of the pipe, the end connector including a swivel to allow relative axial rotation between the lowering device and the unlaid end of the pipe being laid, when coupled. In such embodiments, it is preferable that the end connector is further able to couple co the means for suspending and to allow relative axial rotation between the means for suspending and the unlaid end of the pipe being laid, when coupled.

In yet another preferred embodiment, the lowering device on the vessel is a winch having a winch line for taking the load of, and lowering, the unlaid end portion of the pipe. Preferably, the winch line has a length less than the depth of the sea floor, and the means for suspending is provided to extend the effective length of the winch line to enable the winch to lower the unlaid end portion of the pipe to the sea floor.

According to a second aspect of the present invention, there is provided a method of recovering to a floating vessel the end of a pipe lying on the sea floor, comprising the steps of: (i) lowering, to the end of the pipe to be recovered on the sea floor, means for suspending the end portion of the pipe to be recovered at a raised position in the sea above the sea floor, and coupling the means for suspending to the end of the pipe; (ii) raising the end portion of the pipe to be recovered to the raised position in the sea and suspending the end portion of the pipe to be recovered at the raised position in the sea with the means for suspending; (iii) transferring loading of the end portion of the pipe to be recovered from the means for suspending to a raising device on the vessel; and (iv) raising the end of the pipe to be recovered from the raised position in the sea to the vessel with the raising device.

In one preferred embodiment, the means for suspending is a line that may be coupled at one end thereof to the end of the pipe to be recovered and at the other end thereof to the vessel, and the end portion of the pipe to be recovered is suspended at the raised position from the vessel.

In one more preferred embodiment, the raising device is a winch having a winch line.

In another preferred embodiment, the end of the pipe to be recovered and the means for suspending coupled thereto are raised from the sea floor to the raised position with the raising device or another raising device on the vessel.

In yet another preferred embodiment, after suspending the end portion of the pipe to be recovered at the raised position, means for coupling the raising device to the end of the pipe is directed to the end of the pipe along the means for suspending, and the raising device is thereby coupled to the end of the pipe, before transferring loading of the end portion of the pipe to be recovered from the means for suspending to the raising device. Preferably, the means for coupling the raising device to the end of the pipe is directed along the means for suspending to a position lateral of the vessel beyond the operative range of an ROV lateral of the vessel. Preferably, the means for coupling the raising device to the end of the pipe is directed along the means for suspending to a position lateral of the vessel by a distance greater than 10 m.

In an even further preferred embodiment, the means for suspending is uncoupled from the end of the pipe after the loading of the end portion of the pipe has been transferred to the raising device.

In a yet further preferred embodiment, the means for suspending is recovered to the vessel after the loading of the end portion of the pipe has been transferred to the raising device. Preferably, the means for suspending is recovered to the vessel by winding it onto a reel.

In the foregoing embodiments, a remotely operated vehicle (ROV) may be used for effecting coupling to and uncoupling from the end of the pipe, below the surface of the sea.

The foregoing embodiments may further include repositioning the vessel on the surface of the sea in accordance with changes in the depth of the end portion of the pipe.

The foregoing embodiments may moreover include laterally repositioning the means for suspending on the vessel between a hang-off position from which the pipe may be suspended from the vessel by the means for suspending and a storage position where the means for suspending may be stored on the vessel. Preferably, a crane on the vessel is used for laterally repositioning the means for suspending.

According to a third aspect of the present invention, there is provided apparatus for use in performing the method of any foregoing embodiment, comprising: (i) a winch and winch line for raising and lowering the end portion of the pipe to or from the vessel; (ii) a pennant wire for suspending the end portion of the pipe from the vessel; and (iii) a connector able to be coupled to the end of the pipe and to releasably couple to each of the winch line and the pennant wire.

The apparatus preferably further comprises a remotely operated vehicle (ROV) for coupling the connector to one or more of the end of the pipe, the winch line and the pennant wire.

More preferably, the apparatus further comprises a reel onto which the pennant wire may be wound.

Even more preferably, the apparatus further comprises a snatch block by which the winch line may be lowered to the connector coupled to the end of the pipe, by lowering the snatch block along the pennant wire, when the end of the pipe is coupled to the pennant wire and suspended thereby from the vessel. Preferably, the snatch block is configured to be lowered along the pennant wire to a distance astern of the vessel greater than the operative range of an ROV astern of the vessel. Preferably, the snatch block is configured to be lowered along the pennant wire astern of the vessel by a distance greater than 10 m.

During the pipe-laying process, the pipe being laid must be maintained, astern of the vessel, in a catenary configuration which does not exceed the stress-limits for the material from which the pipe being laid is made. As a result, during the raising or lowering process, the end of the pipe to be coupled to or uncoupled from may be located astern of the pipe-laying vessel by a significant distance. If this distance is too great, an ROV will be incapable to support the weight and lateral forces exerted by the pennant wire or winch line as it is extended laterally (astern) to the end of the pipe, or to support those forces after release of the coupling. The pennant wire and winch line may be heavy and pendulous, beyond the capacity of the ROV to withdraw laterally from the vessel. The operative range of an ROV lateral or astern of the vessel, under such loading, might be only 10 m, 20 m or 50 m. Use of the snatch block to lower the winch line along the pennant wire means the ROV does not need to support such loading, and the operation is then not limited by the ROV capacity.

Yet more preferably, the pennant wire includes an end stop, at one end thereof, by which the pennant wire may be hung from a hang-off point one the vessel for thereby suspending the end portion of the pipe from the vessel by the pennant wire.

Yet even more preferably, the connector includes a body and a coupling for each of the end of the pipe, the winch line and the pennant wire, and wherein at least the couplings for winch line and the pennant line are rotatable relative to the body about axes mutually perpendicular to the axes of the pipe, winch line and pennant wire, when all three are coupled to the connector.

It is further preferred that the connector includes a swivel to allow relative rotation, substantially about the axis of the pipe, between the pipe and either or both of the winch line and pennant wire, when respectively coupled to the connector.

It is preferable that the winch line of the winch for raising or lowering the end portion of the pipe to or from the vessel is not long enough to reach from the vessel to the sea floor, and the pennant wire is utilized to extend the effective length of the winch line so as to reach from the vessel to the sea floor.

According to a fourth aspect of the present invention, there is provided a method for effecting a subsea connection between one line and an object suspended below the surface of the sea by another line, comprising the steps of (i) providing the one line with comprising the steps of: (i) providing the one line with interfacing means; (ii) guiding the interfacing means along the other line to the object; and (ii) connecting the one line to the object.

In a preferred embodiment, the interfacing means includes guide means to guide the one line along the other line. Preferably, the guide means is a snatch-block for constraining the interfacing means to follow the other line.

In another preferred embodiment, the interfacing means includes coupling means by which to couple to the object to effect the connection. Preferably, then, said object comprises cooperative coupling means for effecting the connection with the coupling means of the interfacing means. More preferably, the coupling means and cooperative coupling means include a strop and a connector hook, the connector hook hooking the strop to couple therewith and effect the connection.

According to a fifth aspect of the present invention, there is provided apparatus for guiding one line to an object suspended below the surface of the sea for effecting a subsea connection between the one line and the object, comprising: interfacing means guidable along the other line to the object and for connecting the one line co the object.

In one preferred embodiment, the interfacing means includes a snatch block for constraining the interfacing means to follow the other line as it is advanced.

In another preferred embodiment, the interfacing means includes a strop to couple with a connector hook of the object or a connector hook to couple with a strop of the object, thereby to effect the connection.

To enable a better understanding of the present invention, and to show how the same may be carried into effect, reference will now be made, by way of example only, to the accompanying drawings, in which.

Figure 1:
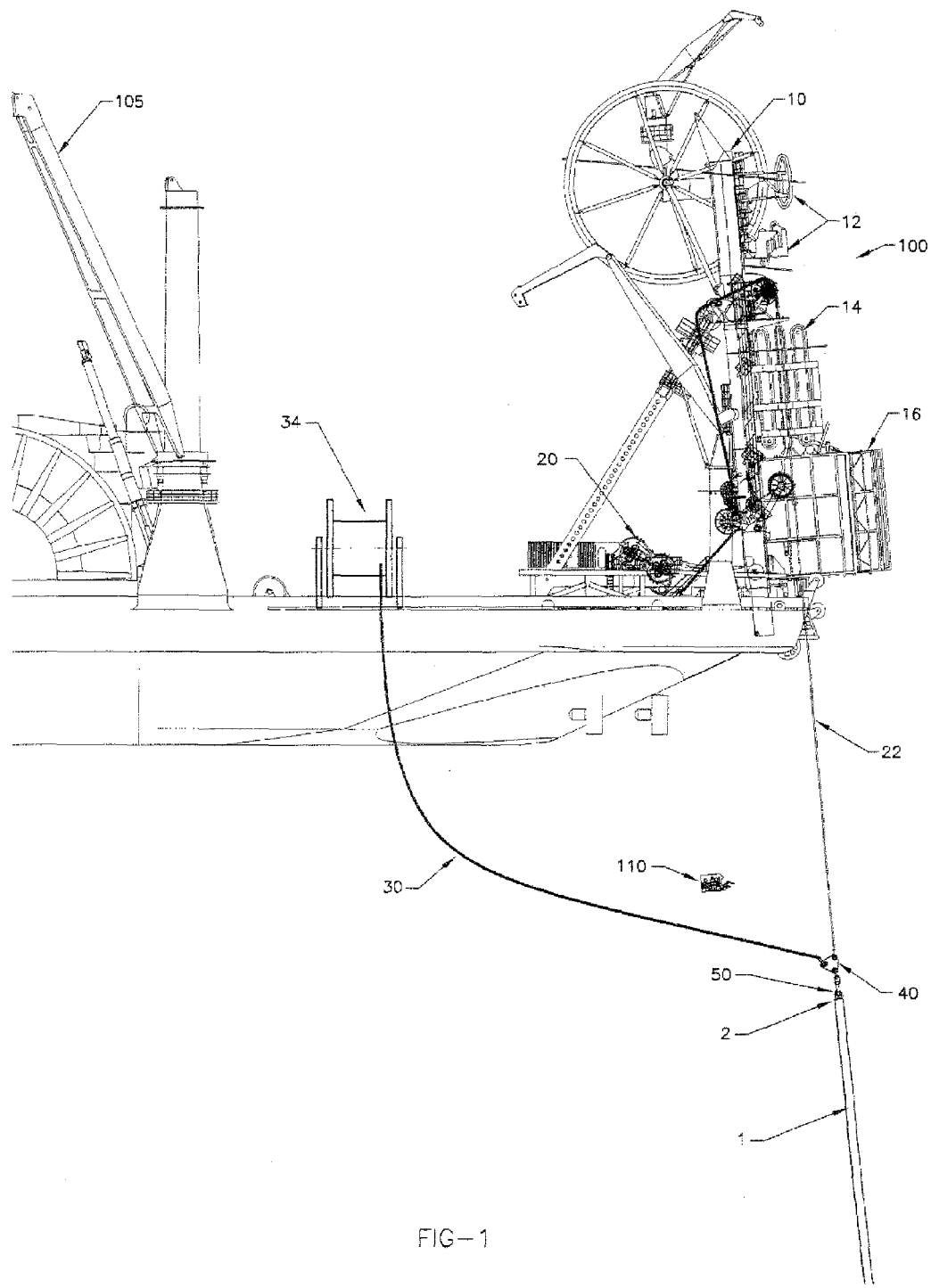
FIG. 1 shows a side schematic view from the port side of a pipe laying vessel which comprises apparatus embodying the present; invention, suitable for carrying out the methods of the present invention.
Figure 2:
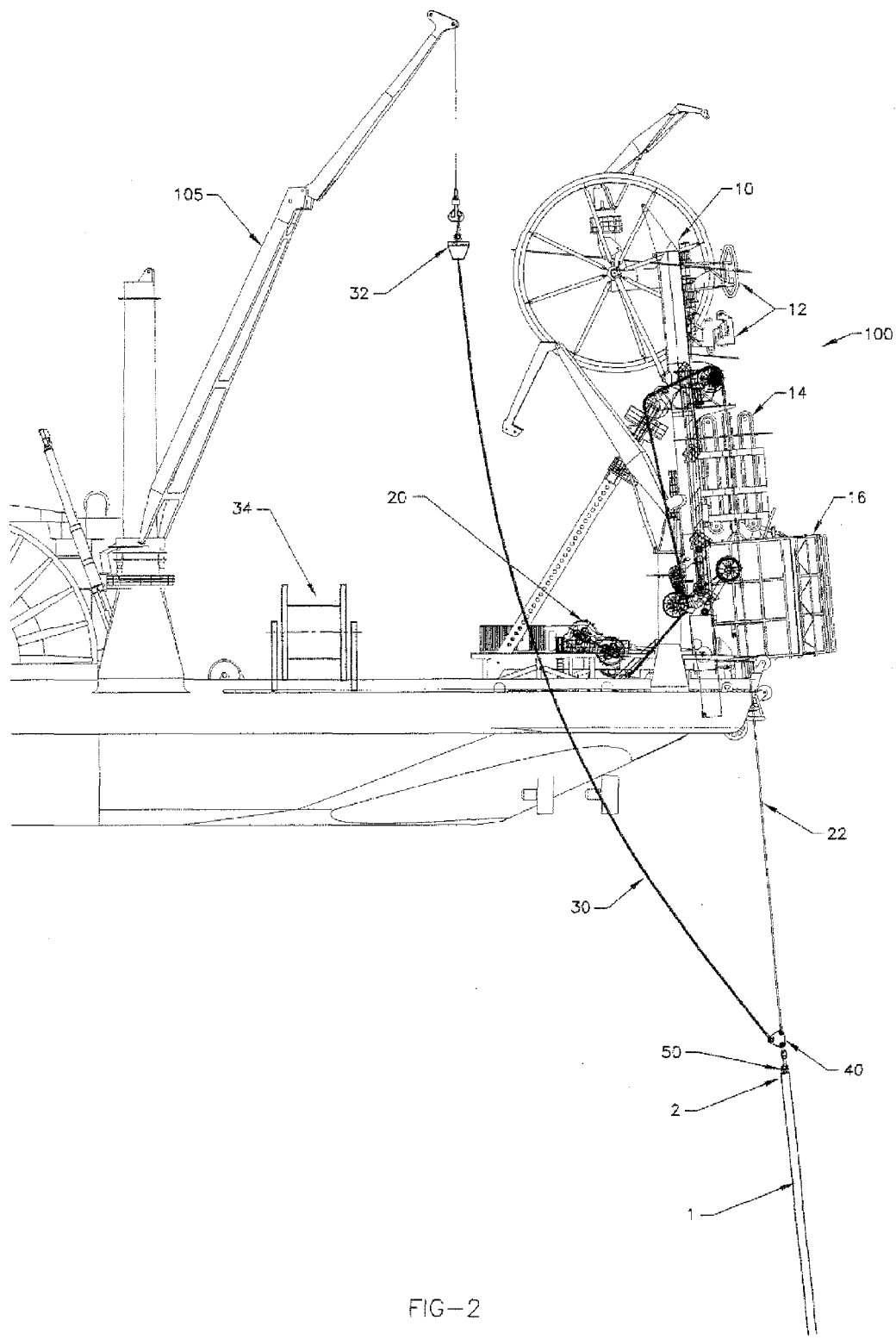
FIG. 2 shows the vessel of FIG. 1, from the port side, as the ship's crane is used to effect lateral transfer of the end stop of a pennant wire from its reel on the port side of the vessel to an end stop holder at the stern of the vessel.
Figure 4A:
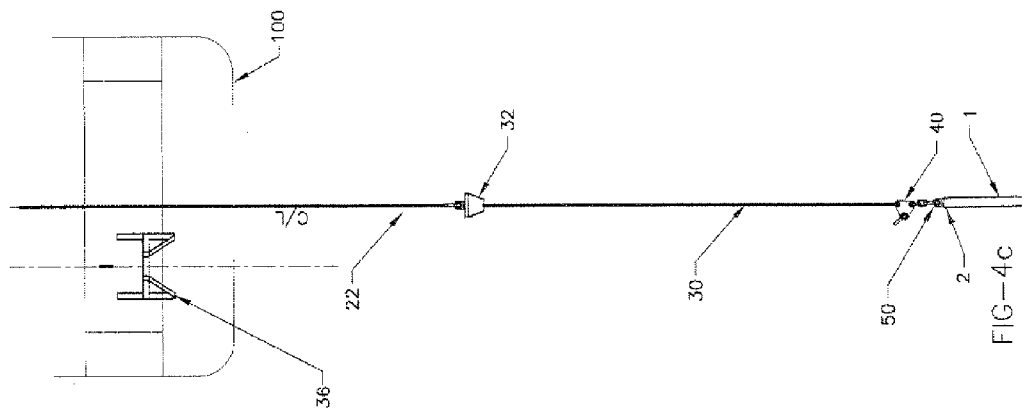
Figure 4B:
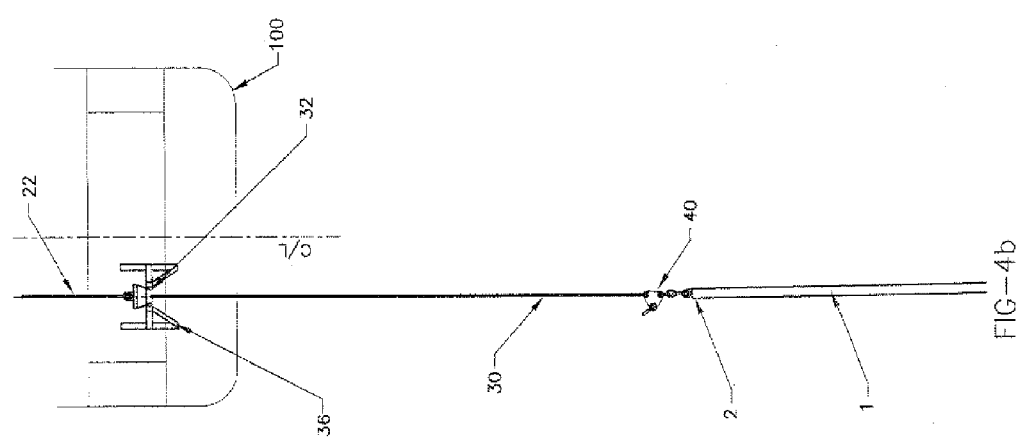
Figure 4C:
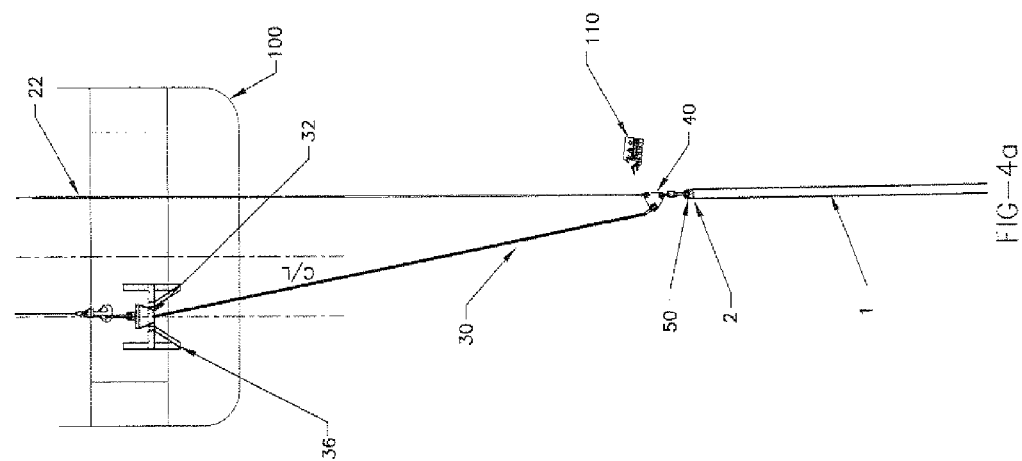
Figure 6:
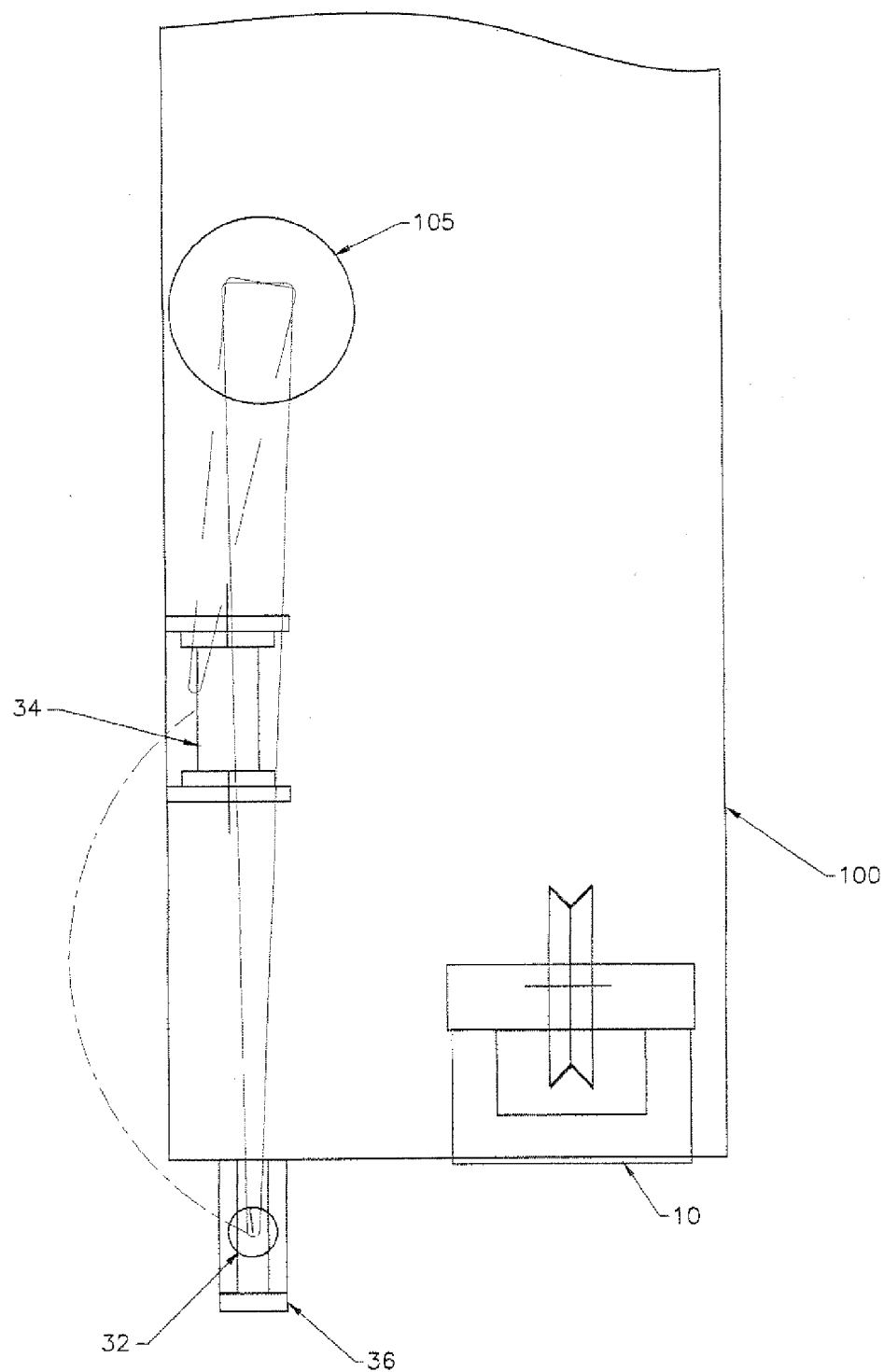
Figure 7A:
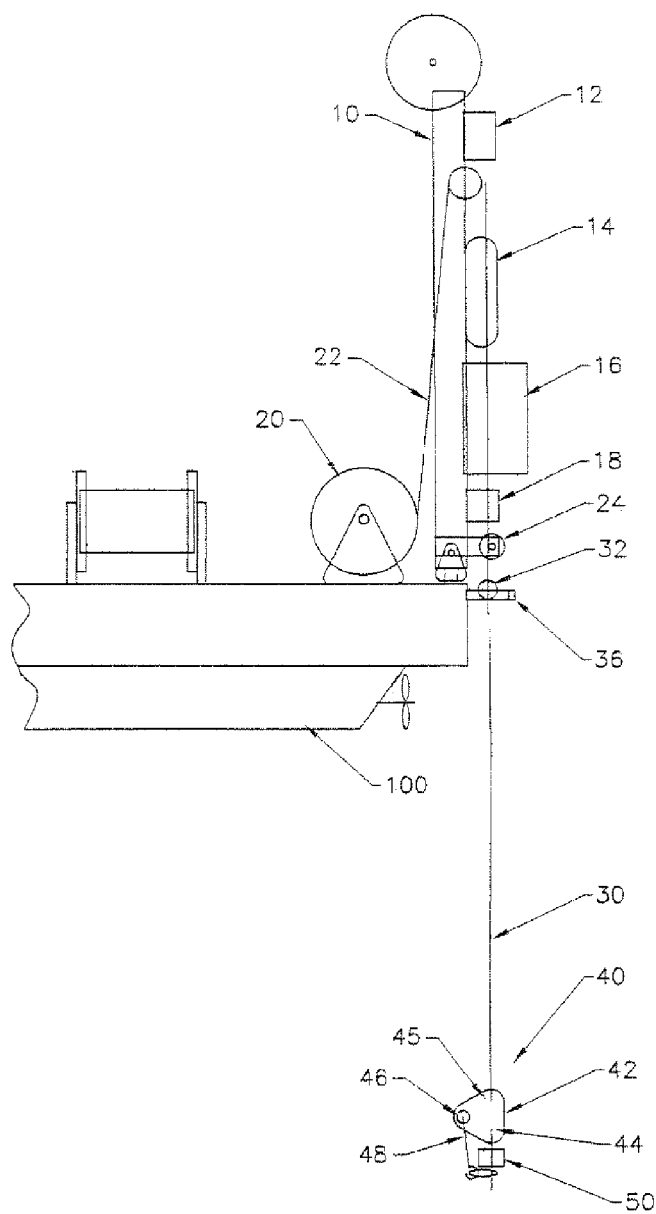
Figure 7B:
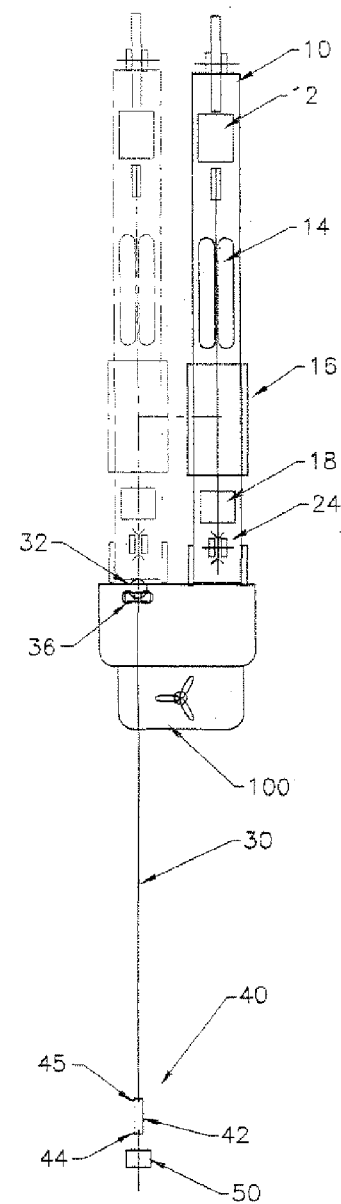
Figures 8A, 8B:
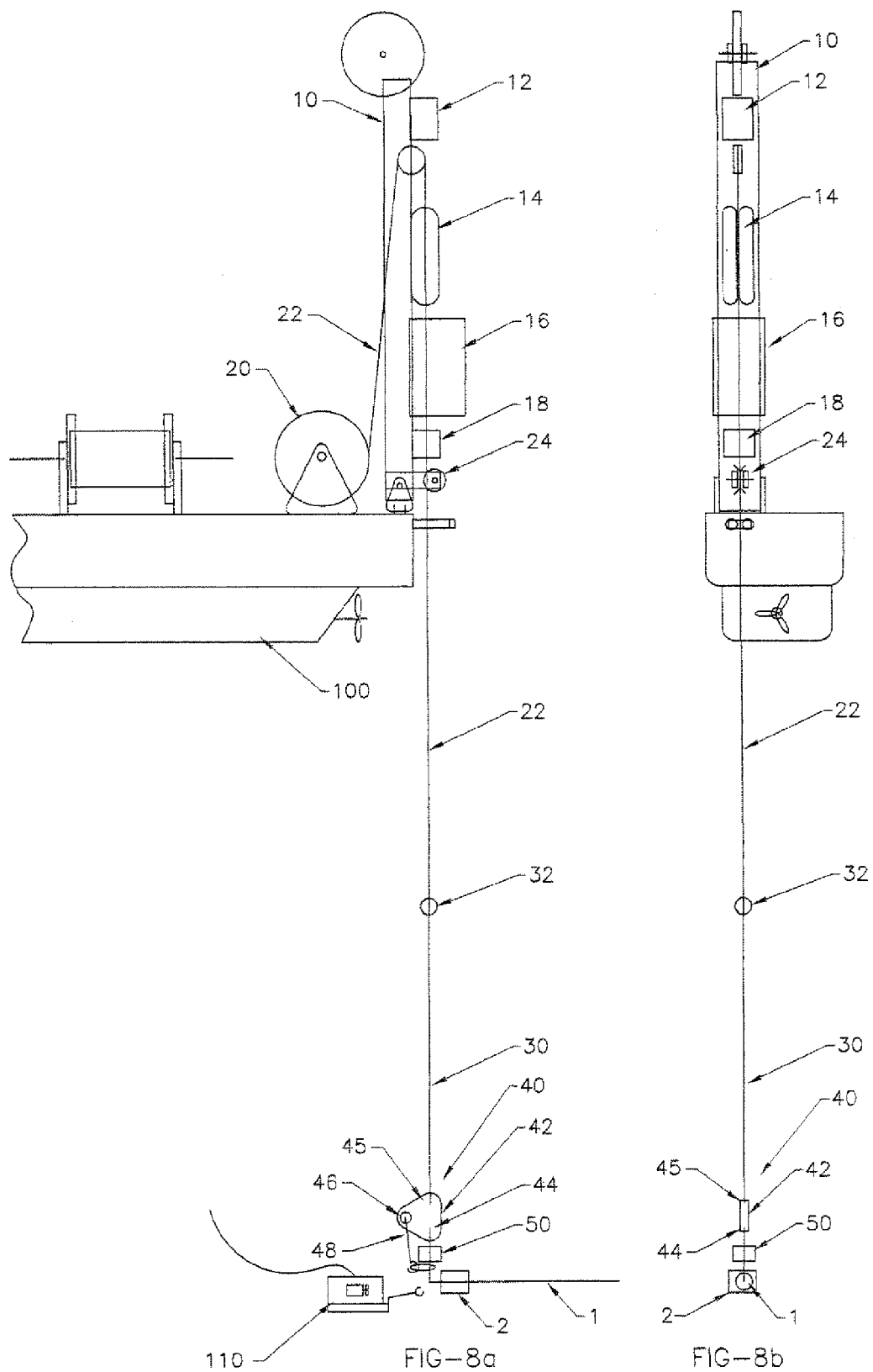
Figures 9B, 9C:
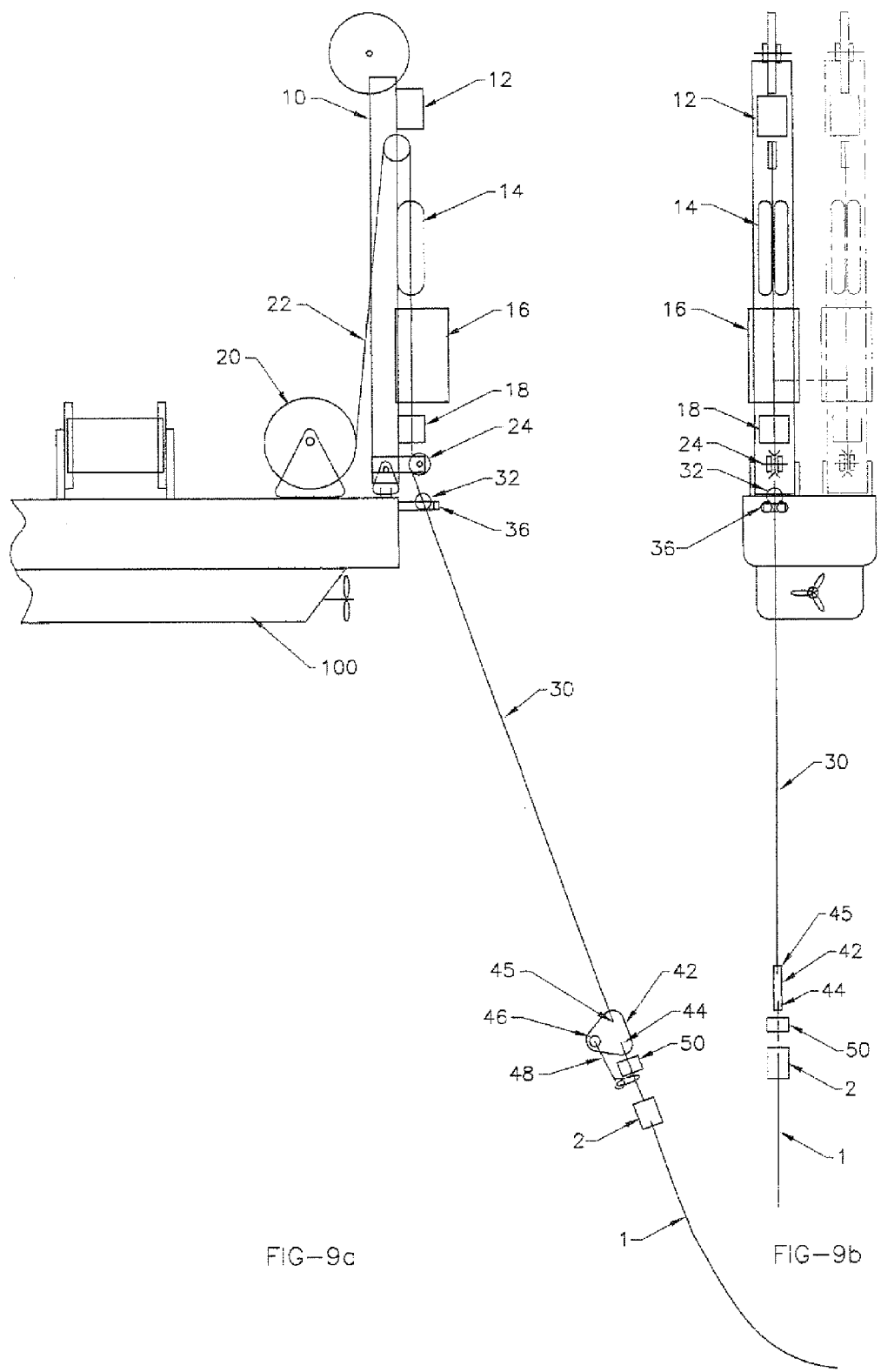
Figure 10A:
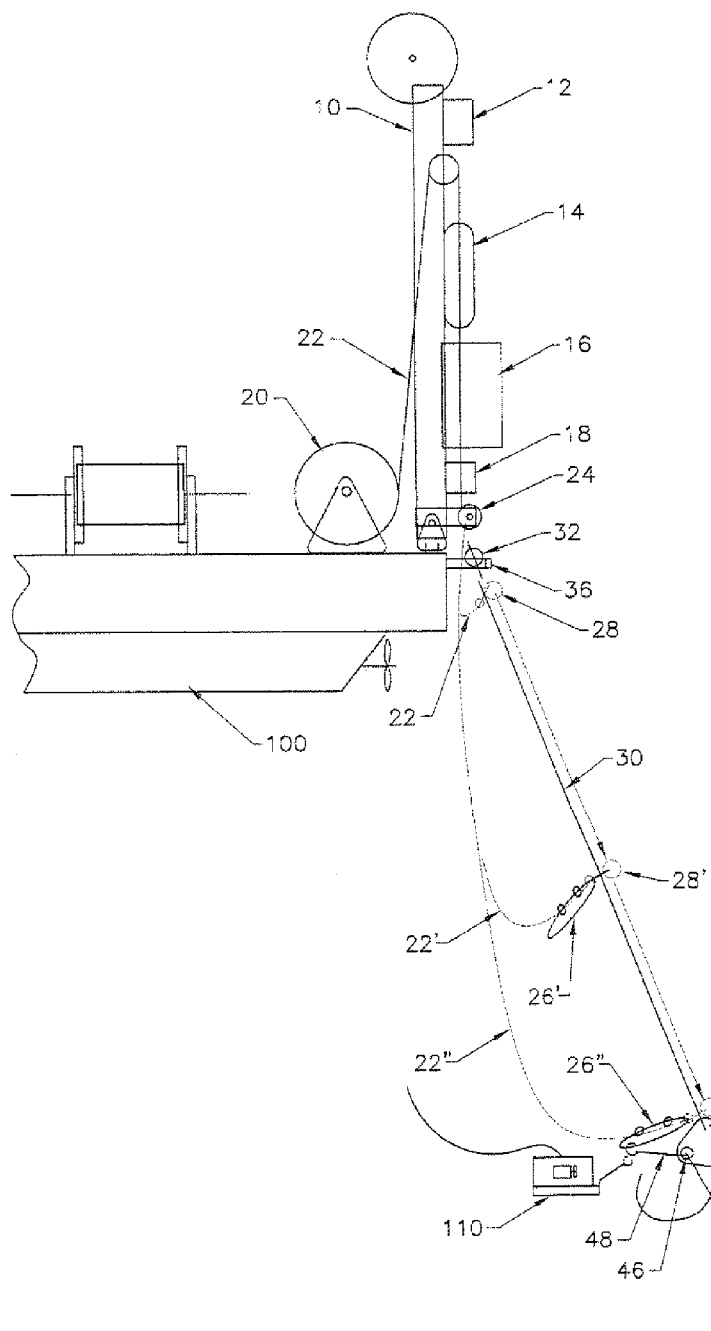
Figure 10B:
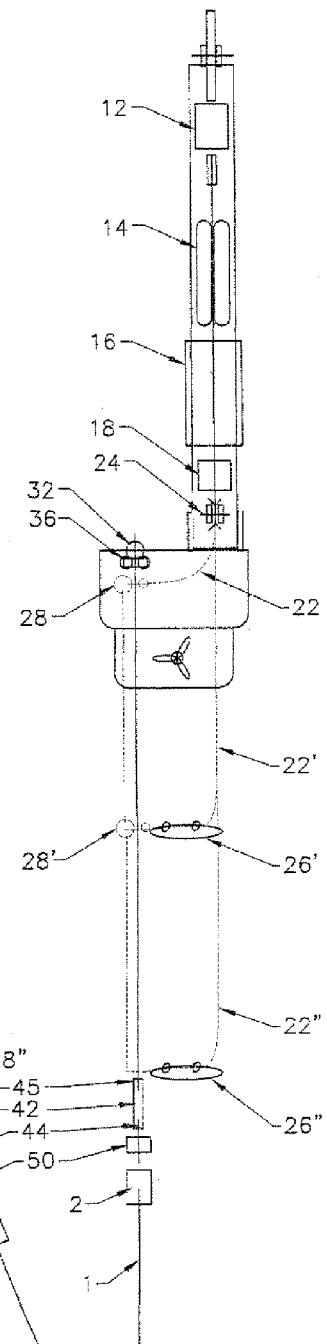
Figures 11A, 11B:
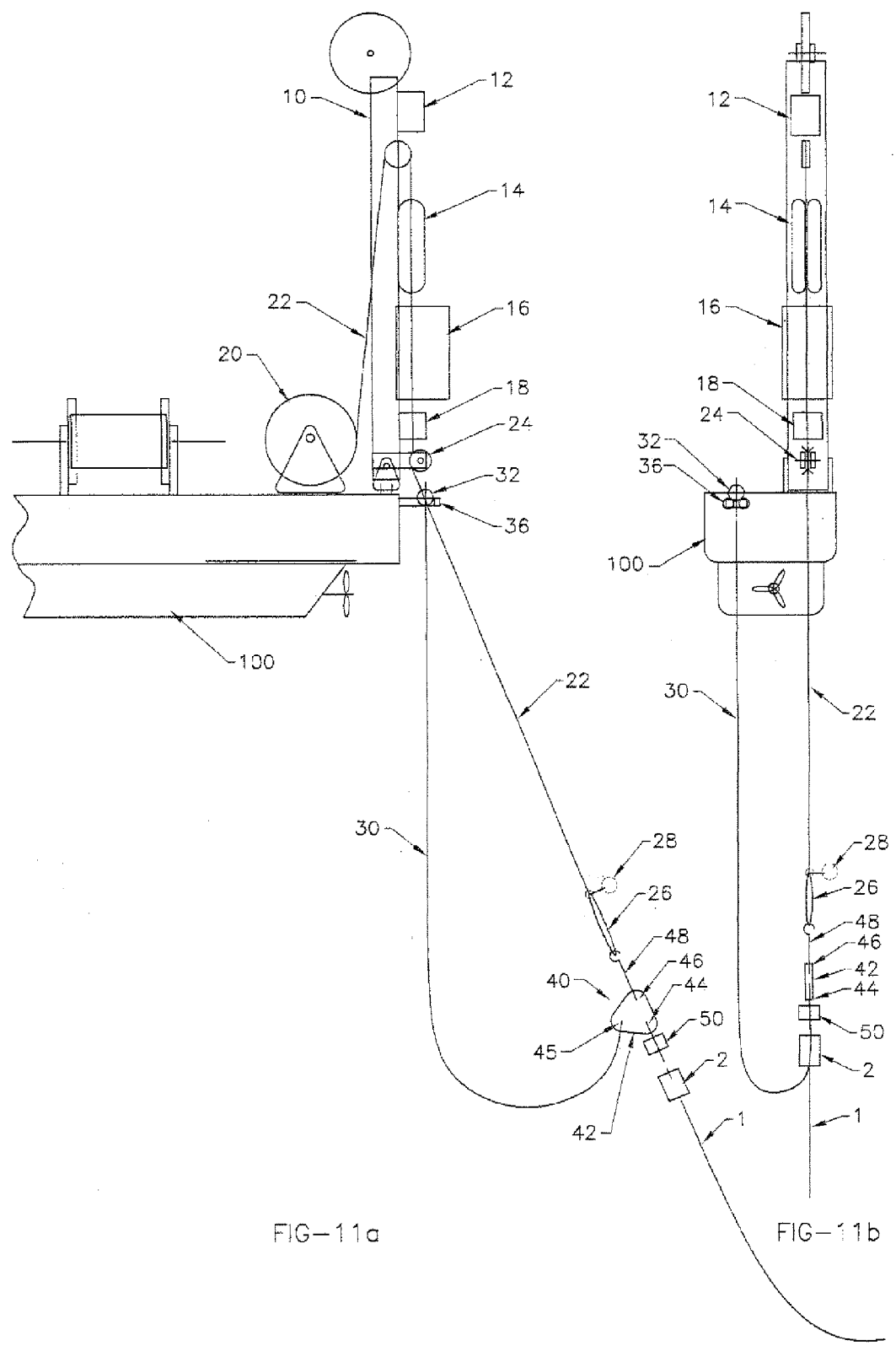
Figure 13:
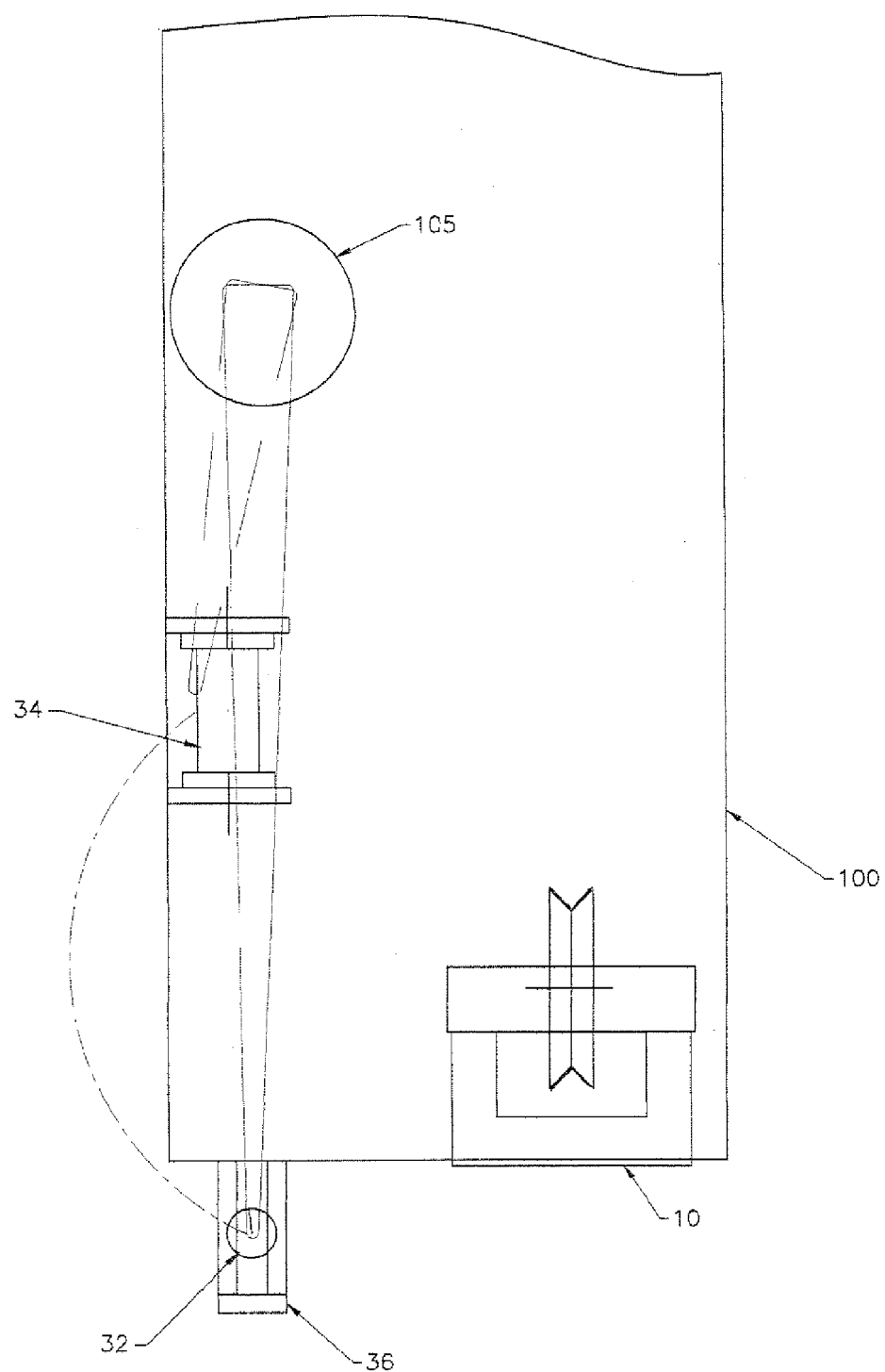

FIG. 3A shows a view of the vessel of FIGS. 1 and 2 from the port side, as the ship's crane is used to manoeuvre the end stop of a pennant wire into the end stop holder for suspending the pennant wire from the stern of the vessel, while FIGS. 3B and 3C illustrate views from above and from the stern of the vessel, respectively, which illustrate how the pennant end stop may be situated in the end stop holder at the stern of the vessel, within the transfer arc of the ship's crane;

FIGS. 4A to 4C show a schematic view of the pipe laying vessel from the stern, illustrating a sequence of steps, following on from the steps of FIGS. 1, 2 and 3A to 3C, during the lowering of the unlaid end of a pipe to the sea floor, including the steps of transferring the loading induced by the end of the pipe from the A&R winch line to the pennant wire, suspending the end portion of the pipe being lowered from, the vessel by the pennant wire; and lowering the pennant wire and the end portion of the pipe suspended therefrom using the A&R winch line;

FIGS. 5A and 5B show diagrammatic views of the vessel from the port and stern directions, revealing the components of the pipe laying ramp, the A&R winch, and the pennant wire and associated equipment, as the pennant wire is unspooled from its reel into the sea;

FIG. 6 shows a further diagrammatic view, from above the vessel, illustrating how the ship's crane may be used to effect a lateral transfer of the upper end of the pennant wire from the pennant reel to an end stop holder at the stern of the vessel, from which the pennant wire can be hung off or suspended;

FIGS. 7A and 7B show diagrammatic views of the vessel from port and stern, with the pennant wire suspended from the end stop holder, and illustrating how the pipe lay ramp may be fleeted from starboard to port so as to connect the A&R winch to the pennant end stop, for lowering the pennant wire into the sea by the A&R winch;

FIGS. 8A and 8B show diagrammatic views of the vessel from port and stern directions illustrating how the pennant wire is lowered by the A&R winch and winch line to enable connection to the end of a pipe to be raised which is lying at the sea floor;

FIGS. 9A and 9B show diagrammatic views of the vessel from port and stem directions, illustrating how the A&R winch is utilized to raise the end portion of the pipe from the sea bed to a raised position above the sea bed, thereby adopting a catenary configuration, the end portion of the pipe being raised to a position where the pipe end portion can be suspended from the vessel by the pennant wire, so that the A&R winch can be disconnected from the pennant wire and the pipe lay ramp can be fleeted from port to starboard to a position laterally displaced from the suspended pennant wire;

FIGS. 10A and 10B show diagrammatic views of the vessel from port and stern directions, as the A&R winch line is lowered along the pennant wire to the suspended end of the pipe being raised and is connected to a connector at the pipe end;

FIGS. 11A and 11B show diagrammatic views of the vessel from port and stern directions, illustrating the transfer of loading of the suspended pipe end portion from the pennant wire to the A&R winch and winch line, so that the pennant wire goes slack;

FIGS. 12A and 12B show diagrammatic views of the vessel from port and stern directions, to illustrate the use of an ROV to uncouple the pennant wire from the end of the pipe being raised;

FIG. 13 shows a diagrammatic view of the vessel from above, illustrating lateral transfer of the pennant wire from the end stop holder at the stern of the vessel to the pennant reel located on a port side of the vessel; and FIGS. 14A and 14B show diagrammatic views of the vessel from port and stern directions, illustrating recovery of the pipe end to the vessel by the A&R winch until the pipe end can be gripped by a hold off clamp at the lower end of the pipe laying ramp, as well as the pennant wire being wound onto and stored on the pennant reel at the port side of the vessel.

FIGS. 1 to 4C illustrate a sequence of steps in the process of lowering the unlaid end of a pipe from the vessel to the sea floor (the lay down process), while FIGS. 5A to 14B illustrate a sequence of steps for the corresponding operation of recovering the end of a pipe lying on the sea floor to the vessel at: the surface of the sea (the recovery process). The same vessel, comprising the same apparatus and equipment, is illustrated in all of FIGS. 1 to 14B, by way of illustration and example, although it will be appreciated that the apparatus of the present invention may take alternative forms, and furthermore than alternative apparatus may be used for carrying out the methods of the present invention.

With reference to all figures of the drawings, the illustrated example of vessel 100 used for lowering or raising the end portion of a pipe 1 having a pipe end 2, will now be described.

The vessel 100 includes a ship's crane 105. Such cranes are typical equipment aboard pipe laying vessels, and have a relatively high capacity as well as a substantial effective reach, for transferring objects around the deck of the pipe laying vessel, and for loading items onto and unloading items from the vessel. Although a pipe laying vessel may be provided with a plurality of cranes, of which one or two will normally be designated as the ship's cranes (typically meaning those with a high capacity and long reach), references to the ship's crane 105 in the present specification can refer to any crane available to the pipe laying vessel 100 for effecting the required lateral transfer operations between locations on board the vessel.

Also associated with the pipe laying vessel 100 is a remotely operated vehicle (ROV) 110, which can be utilized for carrying out subsea operations in the vicinity of the vessel m response to control signals given from on board the pipe laying vessel 100. The ROV 110 is particularly useful for effecting coupling and uncoupling between the pipe end 2 and the lines or wires to be coupled thereto and uncoupled therefrom.

At the stern of the vessel 100 is located a pipe lay-ramp 10, along which pipe to be laid is guided from the vessel into the sea during pipe laying operations. Flexible or rigid pipe is typically unwound from a spool, reel or drum on board the ship, passed over a large-diameter wheel at the top of the pipe lay ramp 10, and then fed down the pipe lay ramp into the sea at an angle of inclination to the vertical appropriate for achieving the desired catenary configuration in the pipe being laid between the surface of the sea and the sea floor. Such a pipe lay ramp 10 is suitable for laying either flexible pipe, which readily adapts to the desired catenary configuration after being unwound from the storage drum, or rigid pipe, which must be straightened as it is fed along the pipe lay ramp into the sea.

To assist pipe laying operations, various items of equipment are provided along the length of the pipe lay ramp 10, from the top to the bottom thereof.

A straightener 12 is provided near the top of the ramp 10, and may consist of one or more sets of tracks or rollers for straightening rigid pipe as it is passed over the large diameter wheel at the top of the pipe lay ramp 1C. This straightener or straightening device removes plastic deformations existing in the rigid pipe resulting from it having been wound onto a storage reel.

A tensioner 14 existing below the straightener 12 has capacity to grip and hold either end of a pipe during the process of laying the pipe, as it is received from the large diameter wheel at the top of the pipe lay ramp 10 and fed into the sea from the vessel 100. Tensioner 14 is particularly effective to hold the first end of a pipe 1 to be laid, such as either prior to connection with an end connector, or prior to joining the said pipe end to the unlaid end of a preceding pipe, for example either by welding or a mechanical end connection.

For effecting such joints, either between connectors or adjacent pipes, a workstation 16 is provided below the tensioner 14. Workstation 16 provides an enclosed and protected area within which welding, testing and various other operations may be conducted on the pipe 1, in particular adjoining adjacent sections of pipe, cutting a partially-laid section of pipe, or for introducing various pipeline components between adjacent pipe sections. Such components might include pipeline end terminations (PLETS), Mid-Line Units (MLU's), buoyancy units and the like.

A hold off clamp (HOC) 18 is provided below the workstation. The HOC 18 is able to grip the unlaid end 2 of a pipe 1, to suspend it from the pipe lay ramp 10. Such facilitates holding the unlaid end portion of a pipe while it is connected either to a pipeline component or the first end of a new pipe to be laid, which has been fed through the tensioner 14, for example by being welded with the further component or new pipe in the workstation 16. Hold off clamp 18 is further able to grip and hold the end 2 of a pipe 1 which has been recovered to the vessel from the sea floor.

The bottom portion of the pipe lay ramp 10 extends over the stern of the vessel, to allow pipe being laid by the vessel 100 to be guided down the pipe lay ramp 10 into the sea.

Forward of the pipe lay ramp 10 is provided an abandonment and recovery (A&R) winch 20. A&R winch 20 is provided with a winch line or wire 22. Winch line 22 can be fed from the A&R winch 20 over a sheave on the pipe lay ramp, to be guided down the ramp 10 into the sea via an A&R sheave 24 located therebelow. A&R sheave 24 serves to hold the A&R line away from contact with the pipe lay ramp 10 or the stern of the vessel 100. A&R sheave 24 is desirably retractable, to allow it to be moved out of the way of pipe lay operations during normal use of the pipe lay ramp 10 for laying pipe.

Also located at the stern of the vessel 100 is an end stop holder (ESH) 36, which extends from the stern of the vessel 100. As is particularly illustrated m FIGS. 7B and 9B, the pipe lay ramp 10 is preferably mounted to the stern of the vessel, and can fleet in port and starboard directions, thus being arranged to bring the pipe lay ramp 10, or the A&R winch line 22 running along it, into and out of alignment with the end stop holder 36, as required.

The vessel 100 is furthermore provided, at a location, in the illustrated example, on the port side thereof, with a pennant reel 34, on which a pennant wire 30 can be wound for storage. In use, pennant wire 30 is unwound from the pennant reel 34, and can be deployed therefrom, at the location on the port side of the vessel 100, into the sea. A first end of the pennant wire is able to be unreeled into the sea and to be coupled with the end 2 of a pipe 1 below the surface of the sea. The second end of the pennant wire 30 is provided with a pennant end stop (PES) 32, which may be or include a pad eye. Pennant end stop 32 is provided with means by which it may be lifted by the ship's crane 105, and similarly may be connected to the winch line 22 of the A&R winch 20. The pennant end stop 32 is particularly configured so that it may be positioned in the end stop holder 36 at the stern of the vessel 100, so that the pennant wire 30 can be suspended from the stern of the vessel 100, and in particular so that the end portion of a pipe 1 may be suspended by the pennant wire 30 below the surface of the sea from the stern of the vessel 100.

In one mode of operation, for the recovery of an end portion of the pipe 1 from the sea floor to the vessel, the pennant wire 30 is used, while the end portion of the pipe 1 is suspended from it, as a guide for leading the end of winch line 22 from the A&R sheave 24 to the end 2 of pipe 1, or to a connector 40 at the pipe end 2. Although, in principle, the ROV may be used to draw out, support and transport the free end of the pennant wire or winch line, this is not always possible. During the pipe-laying process, the pipe being laid must be maintained (astern of the vessel) in a catenary configuration which does not exceed the stress-limits for the material from which the pipe being laid is made. As a result, during the raising or lowering process, the end of the pipe to be coupled to or uncoupled from may be located astern of the pipe-laying vessel by a significant distance. If this distance is too great, an ROV will be incapable to support the weight and lateral forces exerted by the pennant wire or winch line as it is extended laterally (astern) to the end of the pipe, or to support those forces after release of the coupling. The pennant wire and winch line may be heavy and pendulous, beyond the capacity of the ROV to withdraw laterally from the vessel. The operative range of an ROV lateral or astern of the vessel, under such loading, might be only 10 m, 20 m or 50 m. The present mode of operation avoids using the ROV to support loading forces from the pennant wire or winch line, so that the operation is then not limited by the ROV capacity.

For this purpose, a snatch block 28 is provided, by which the end of the A&R line 22 is guided along the pennant wire 30 to the end 2 of the pipe 1, or to a connector 40 at the end 2 of the pipe 1. An A&R strop 26 is additionally provided, in conjunction with the snatch block 28, by which a releasable coupling may be effected between the end of the A&R winch line 22 and the end 2 of the pipe 1 or a connector 40 at the end 2 of the pipe 1.

To enable suitable, preferably releasable coupling to be effected between either or both of the pennant wire 30 and winch line 22 on one side, and the end 2 of the pipe 1 on the other side, a connector 40 is provided. Connector 40 is illustrated only in diagrammatic form in the accompanying drawings of the present application, although more specific details of a suitable such connector may be found in GB 2 434 627 A, in particular with reference to FIGS. 1, 1A, 7, 7A, 8, 8A, 9 and 9A thereof, along with the associated description.

Connector 40 particularly includes a connector body 42, which may be a so-called tri-plate, to which are mounted a series of connector couplings 44, 45 and 46, for connection to each of the pipe end 2, pennant wire 30 and winch line 22, respectively. It is preferred that the connector couplings are able to effect a releasable coupling with each of the pipe end 2, pennant wire 30 and winch line 22, although the connector 40 may be fixedly attached to the end 2 of the pipe 1 prior to abandonment, so as to facilitate subsequent recovery of the end portion of pipe 1 from the sea floor. The releasable coupling is preferably able to be effected and released by the ROV.

The connector 40 is preferably provided, between the connector body 42 and the end 2 of pipe 1, with a swivel 50. Swivel 50 is provided to permit relative rotation, between the connector body 42 and the end 2 of pipe 1, substantially about the axis of pipe 1, so as to mitigate transmission of rotational forces from the pipe 1 to the connector body 42, or vice versa. Swivel 50 is particularly provided so as to prevent twisting of connector body 42 when coupled with all three of the pipe end 2, the pennant wire 30 and the winch line 22, which could lead to the pennant wire 30 and winch line 22 becoming entangled in the region between the end 2 of the pipe 1 and the vessel 100 at the surface of the sea.

Furthermore, it is preferable for each of the couplings 44, 45 and 46 to provide for relative rotation between the end 2 of the pipe 1, the end of the pennant line 30 and the end of the winch line 22 about axes perpendicular to the plane containing all three connector couplings 44, 45 and 46. Specifically, this allows the connector 40 to provide alignment between the axis of the pipe 1, which is being raised or lowered to or from the vessel, and the respective one of the winch line 22 and pennant wire 30 which is presently loaded with the induced weight of the end portion of the pipe 1. This reduces or eliminates the generation of bending stresses in the connector body 42, or in the ends of the pipe 1, winch line 22 or pennant wire 30, as the loading of the end portion of the pipe 1 is carried through the connector 40. Moreover, the connector 40 thereby allows transfer of the loading of the end portion of the pipe 1 between the pennant wire 30 and winch line 22 without generating substantial levels of such bending stress in the connector body 42.

Consideration will now be given to the use of the above described apparatus in carrying out abandonment and recovery operations in accordance with the methods of the present invention, and as illustrated by way of example in the accompanying drawings.

Referring now to FIGS. 1 to 4C, there will be described a method of positioning on the sea floor, from a floating vessel, an unlaid end portion of a pipe that is being laid on the sea floor, as an example in accordance with the present invention.

Prior to the step illustrated in FIG. 1, a pipe laying operation has commenced, in which pipe 1 is being laid on the sea floor from the vessel 100 by advancing the pipe 1 from a spool drum or other storage facility located on the vessel down the pipe lay ramp 10 into the sea. During the process of laying the pipe 1 on the sea floor, it has then become necessary to lay down or abandon the unlaid end of the pipe 1.

In a lay down event, the pipe to be laid has been laid substantially to its desired length, and pipe laying will be completed by the step of laying down the end 2 of pipe 1. To facilitate this, the end 2 of pipe 1 is held in the hold off clamp 18 at the lower end of the pipe lay ramp 10 while any desired end connector is affixed to the end 2 of the pipe 1 within the workstation 16.

In the case of abandonment, if the abandonment is scheduled, or if time otherwise permits, pipe 1 continues to be laid until the end 2 of pipe 1 is held in the hold off clamp 18, accessible from the workstation 16. In the alternative, for example if there is a fast-approaching adverse weather event, the pipe 1 is gripped in both the hold off clamp 18 and the tensioner 14 and is cut, to form an unlaid end 2 held in the hold off clamp at the location of the workstation 16. If necessary, the cut portion of pipe extending back to the spool or drum on the vessel can be reversed up the pipe lay ramp by a suitable amount, using the tensioner 14 or other devices located on the vessel 100, to allow access to the cut end 2 of the pipe 1 which is being laid.

In all of the above cases, connector 40 is then attached to the end 2 of the pipe (or to the end of any additional component connected thereto). Connector 40 includes swivel 50 intermediate between connector body 42 and the end 2 of the pipe 1, preventing any twist in the pipe 1 from being transmitted to the connector body 42 or any lines or wires attached thereto.

As shown in FIG. 1, A&R winch 20 feeds winch line 22 along pipe lay ramp 10, and the end of winch line 22 is coupled to the connector body 42 by connector coupling 46. The hold off clamp 18 is then released and the unlaid portion of pipe 1 is lowered into the sea by the A&R winch 20. As illustrated in FIG. 1, since the connector couplings 44 and 46 and the connector body 42 are able to rotate relative to one another, the axes of the winch line 22 and the pipe 1, coupled to connector couplings 46 and 44, respectively, become aligned with each other under tension, without generating bending stresses in the connector body 42.

Pennant wire 30 is then fed out from pennant reel 34 on the port side of vessel 100, and the end of the pennant reel 34 is coupled to the connector body 42 by remotely operated vehicle (ROV) 110. The pennant wire 30 is essentially slack, and thus does not significantly influence the orientation of the connector body 42.

As an alternative to coupling the pennant line 30 to the connector coupling 45 under water using the ROV, it would equally be possible to feed the end of pennant wire 30 to the work station 16, for connection to the connector coupling 45 in the workstation 16 while the end 2 of pipe 1 being laid is still held in the hold off clamp 18.

Pennant wire 30 continues to be unreeled from pennant reel 34 until pennant end stop 32 is exposed and the pennant wire 30 is fully unwound. The ship's crane 105 is then used to transfer the pennant end stop 32 laterally from the location of the pennant reel 34 on the port side of the vessel 100 to the end stop holder 36 at the stern of vessel 100, as shown in FIGS. 3A to 3C.

The A&R winch 20 may continue to lower the end portion of pipe 1 carried on winch line 22 during the pennant unreeling and transfer process, or may hold the end portion of pipe 1 at a fixed depth whilst the pennant end stop 32 is laterally transferred by ship's crane 105. In either case, the A&R winch 20 continues to pay out the A&R winch line 22 so as to continue lowering the end portion of the pipe 1 being laid towards the sea floor.

As shown in FIGS. 4A to 4C, the pennant wire 30, suspended by pennant end stop 32 from end stop holder 36 at the stern of vessel 100, eventually becomes drawn taut as A&R winch line 22 is further paid out, and the loading of the end portion of pipe 1 thereby transfers from winch line 22 to pennant wire 30. ROV 110 is then utilized to uncouple the end of winch line 22 from connector coupling 46, leaving the end portion of pipe 1 suspended from the vessel 100 by pennant wire 30, which is held by pennant end stop 32 at the stern of vessel 100 in the end stop holder 36 (see FIG. 4B). As a result of transferring the loading induced by the end portion of pipe 1 from the winch line 22 to the pennant wire 30, the connector couplings 44 and 45 rotate relative to connector body 42 to bring the axis of the end portion of pipe 1 being laid substantially into alignment with the axis of the pennant wire 30, practically eliminating bending stresses that would otherwise develop, under such tension, in the connector body 42.

Having been uncoupled from connector body 42, the A&R winch line 22 is recovered to the pipe lay ramp 10, which is then fleeted (not shown) into position over the end stop holder 36 to allow the end of winch line 22 to be connected to the pennant end stop 32, as illustrated in FIG. 4E. A&R winch 20 is then used to lift pennant end stop 32 out of end stop holder 36, and thereafter to lower pennant wire 30, and the end portion of pipe 1 suspended thereby, toward the sea floor, by once again advancing winch line 22 towards the sea floor.

It is preferred, once the A&R winch has taken the loading of the pennant wire 30 and the end portion of the pipe 1 being laid that is suspended therefrom, for the end stop holder 36 to be retracted or otherwise folded away, so as not to interfere with the subsequent lowering or raising operations using the A&R winch 20.

It is additionally preferred, as shown in FIG. 4C, once the A&R winch 20 and winch line 22 have taken the loading of the pennant wire 30 and the end portion of pipe 1 suspended therefrom, for the pipe lay ramp 10 to be fleeted to the centerline (C/L) of vessel 100, to improve stability.

As indicated above, one of the drawbacks of using the A&R winch 20 for the entire lowering operation of the end portion of pipe 1 from vessel 100 to the sea floor is that the A&R winch line 22 must necessarily be relatively thick in order to possess the desired loading capacity (safe working load). Pennant wire 30, by contrast, can have a significantly lower capacity than the winch line 22, since, by the time the end portion of pipe 1 has been lowered to the depth where the loading induced by the end portion of pipe 1 being laid can be transferred to the pennant 30 held in the end stop holder 36, the actual loading induced by the end portion of pipe 1 will be significantly lower than the loading induced when the end portion of the pipe 1 is at the surface of the sea. Pennant wire 30 can therefore be of a significantly reduced diameter, weight and cost, as compared with the winch line 22.

Once the depth of the sea in the region where the pipe is to be laid in known, a suitable length pennant wire 30 can be selected, so that the depth of the lowered position, at which the pennant wire 30 will suspend from the end stop holder 36 the end portion of the pipe 1 being lowered, will be sufficiently deep so that the loading induced by the end portion of the pipe 1 will not exceed the safe working load of the pennant wire 30. More specifically, if one knows the depth from the surface of the sea to the sea floor ac the working position of vessel 100, one can determine the depth below the surface at which the loading induced by the end portion of the pipe 1 being laid will fall below the safe working load of the pennant wire 30. The pennant wire 30 can then be selected to have a length which will reach to a sufficient depth, when the pennant wire 30 is suspended from the end stop holder 36 at the stern of vessel 100, to enable the pennant wire 30 to suspend the end portion of pipe 1 at such a predetermined lowered position within its safe working load.

Once the end 2 of pipe 1 being lowered has been lowered entirely to the sea floor, the ROV 110 is used to uncouple the pennant wire 30 from connector coupling 45, leaving the pipe 1 on the sea bed with the connector 40. The A&R winch 20 is then used to recover the A&R winch line, and thereby to raise the pennant wire back to the vessel, where the pennant end stop 32 can be set in the end stop holder 36 once more. After fleeting the pipe lay ramp 10 out of the way, the ship's crane 105 can be used once more to transfer the pennant end stop 32 laterally from the end stop holder 36 back to the pennant reel 34 on the port side of vessel 100, whereafter the pennant wire 30 can be wound back onto pennant reel 34 to be stored.

Because it is desirable to make the end stop holder 36 retractable, during the portions of the pipe end portion lowering operation in which end stop holder 36 is not in use, various arrangements for the end stop holder 36 are possible. In one such arrangement, the end stop holder can take the form of a simple two-pronged support extending from the stern of vessel 100. Pennant wire 30 simply passes between the two prongs, with the pennant end stop 32 resting on the two prongs for suspending the pennant wire 30 therefrom. A&R sheave 24, which is configured itself to be retractable, can then be used to push the A&R winch line out from between the two prongs, to release the pennant end stop 32 and pennant wire 30 from the end stop holder 36, for advancement into the sea by the A&R winch 20.

It will be appreciated that during the lowering of the end portion 2 of pipe 1, due to the need to maintain an acceptable catenary configuration which does not over-stress the pipe 1, it is normally necessary to reposition the pipe laying vessel 100 (along the lay line, and some way ahead of the pipe end 2), since the lateral position of the end 2 of the pipe 1 being lowered will continue to extend in the direction of orientation of the pipe 1 (lay line) as it is lowered to the sea floor.

With reference to FIGS. 5 to 14B, there will now be described an example of a method for recovering to a floating vessel the end of a pipe lying on the sea floor, in accordance with the present invention.

As shown in FIGS. 5A and 5B, the end of pennant wire 30 is first connected to connector coupling 45 on connector plate 42 of a connector 40.

As is evident in FIG. 5A, the connector coupling 46, for attachment to the end of A&R winch line 22, is provided with a connector hook 48 to facilitate underwater coupling of the winch line 22 to the connector 40, as will be described below. Notably, the connector hook 48 is initially retained m a retracted configuration, to avoid entanglement or damage, retained in place by a friable strap which maintains it in alignment the connector coupling 44 to be attached to the end 2 of pipe 1 lying on the sea bed.

In the case that connector 40 was not recovered when the end portion of pipe 1 was abandoned to the sea floor, there is no need to attach such a connector 40 to the end of pennant wire 30 at this stage, since the end of pennant wire 30 can be coupled to the connector coupling 45 at the sea floor, using the ROV. The following description, however, refers to the situation in which connector 40 has been recovered from the end 2 of pipe 1 during the abandonment process, and is thus in this method connected to the end of pennant wire 30 as an initial step.

Pennant wire 30 is then unreeled from pennant reel 34, as shown in FIG. 5A, from the port side of vessel 100 into the sea.

As shown in FIG. 6, the ship's crane 105 is then used to pick up the pennant wire 30 by the pennant end stop 32, once it has been fully unwound from pennant reel 34, and to transfer the pennant wire laterally from its position at the port side of the vessel 100 to the end stop holder 36 at the vessel stern, similarly as for in the above described pipe lowering method. The pennant wire 30 is then suspended by the pennant end stop 32 from the end stop holder 36 at the stern of the vessel 100, with the connector 40 suspended at a predetermined distance below vessel 100 corresponding to the length of the pennant wire 30. As shown in FIG. 7B, pipe lay ramp 10 is then fleeted to the port side of vessel 100, bringing the A&R winch line 22 into alignment with the end stop holder 36, and the end of winch line 22 of the A&R winch 20 is connected to the pennant end stop 32 located in the end stop holder 36.

In any suitable manner, for example as described above, the pennant end stop 32 is then brought out of engagement with the end stop holder 36, following which the pennant wire 30 is lowered by A&R winch 20 until the connector 40 is brought to the end 2 of pipe 1 on the sea floor, as illustrated in FIGS. 8A and 8B. During this process of lowering the pennant wire 30 by the A&R winch 20, the end stop holder 36 may be retracted so as not to interfere with the A&R winch line 22, or the pipe lay ramp 10 may be fleeted out of alignment with the end stop holder 36, to avoid interference.

Remotely operated vehicle (ROV) 110 is then used to couple the end 2 of pipe 1 to connector coupling 44 of the connector 40. As described above, swivel 50 is preferably disposed intermittent between the end 2 of pipe 1 to be raised and the connector body 42.

A&R winch 20 is then used to raise the end portion of pipe 1 to a partially raised position above the sea floor by winding in the AS-R winch line 22 so as to draw the pennant end stop 32 back to the vessel 100 at the surface of the sea. During the process of raising the end portion of pipe 1 with the A&R winch 20, the vessel 100 must again be laterally repositioned on the sea surface, to account for and accommodate the flexure of the pipe 1 between the essentially linear configuration on the sea floor and the eventual acceptable catenary shape extending between the sea floor and the partially raised position.

Pennant end stop 32 is then set in end stop holder 36, so as to suspend the end 2 of the pipe 1 being raised from the sea floor from vessel 100 at the partially raised position, which is at a predetermined depth below the sea surface corresponding to the length of the pennant wire 30. The predetermined depth at which the end 2 of pipe 1 is suspended beneath the surface of the sea equally corresponds to a given height above the sea floor, for which the loading induced, by the partially raised end portion of pipe 1, in the pennant wire 30 is known to be below the safe working load for the pennant wire 30.

With the pennant end stop 32 in the end stop holder 36, the tension on the A&R winch line 22 is released, transferring the loading to the pennant wire 30. As described above, this causes the connector couplings 44 and 45 to rotate relative to connector housing 42, aligning the axis of pipe 1 with the axis of pennant wire 30 and mitigating generation of bending stresses. The winch line is then uncoupled from the pennant end stop 32, leaving the end portion of the pipe 1 suspended from the end stop holder 36 at the stern of vessel 100, as shown in FIGS. 9A and 9B.

As shown schematically m FIGS. 10A and 10B, the uncoupled end of the winch line 22 of A&R winch 20 is then lowered to the connector 40 at the suspended position above the sea floor. FIGS. 10A and 10B show the winch line 22 at several positions as it is lowered to the connector 40. For this purpose, a snatch block 28 is coupled to the end of A&R winch line 22, so as to allow the winch line 22 to be guided down to the connector 40 along the pennant wire 30 which is suspended from the end stop holder 36 at the stern of the vessel 100. As well as snatch block 28, the end of winch line 22 is equipped with A&R strop 26, which is attached to it by friable straps, as is most apparent from FIGS. 10A and 10B. The different positions of the winch line 22, as it is lowered from vessel 100 to connector 40, are annotated by the same reference numerals in FIGS. 10A and 10B, with the addition of prime and double-prime marks to indicate the position of the various components at different points in time as the winch line 22 is advanced to the connector 40. To this end, reference numerals 22', 26' and 28' show the winch line 22, A&R strop 26 and snatch block 28 lowered approximately halfway along the pennant wire 30, while references 22", 26" and 28" indicate the position of the winch line 22, A&R strop 26 and snatch block 28 lowered substantially ail the way to the connector 40.

A&R strop 26 provides means by which the winch line 22 can be coupled to the connector plate 42.

More specifically, FIG. 10A demonstrates diagrammatically how ROV 110 is used to break the friable lashing, by which the connector hook 48 of connector coupling 46 is bound to the connector coupling 44, thereby releasing the connector hook 48 to pivot relative to the connector body 42. ROV 110 can then locate the connector hook 48 in engagement with the A&R strop 26, as shown m FIG. 10A.

The A&R winch 20 draws the A&R winch line towards vessel 100 on the surface of the sea, thereby breaking out the A&R strop and transferring the loading induced by the end portion of the pipe 1 from the pennant wire 30 to the winch wire 22 of the A&R winch 20, via the strop 26 and the hook 48, and thus causing the winch wire 30 to go slack, as shown in FIGS. HA and HB.

ROV 110 then uncouples the pennant wire 30 from connector coupling 45 of the connector 40, releasing the pennant from an initial position 30' to the released position 30, shown in FIGS. 12A and 12B.

As shown in FIG. 13, the ship's crane 105 is then used to transfer the pennant end stop 32 laterally from the end stop holder 36 to the pennant reel 34 on the port side of vessel 100.

Referring to FIGS. 14A and 14B, winch line 22 is further wound onto the A&R winch 20 to draw the end 2, of the pipe 1 being raised to the surface of the sea, onto to the vessel 100. FIGS. 14A and 14B illustrate the arrangement of the winch line 22, from which are suspended the snatch block 28, A&R strop 26, connector 40 (coupled to the A&R strop 26 by hook 48) and the end 2 of pipe 1, in two different positions. Specifically, these noted elements, establishing the connection between the winch line 22 and the end 2 of pipe 1, are shown in solid lines at the point when they first reach the vessel 100, and also in dashed lines after they are drawn by the A&R winch 20 up the pipe lay ramp 10. It can thus be seen how, in the second, raised position, illustrated in dashed lines, the end 2 of the pipe 1 which has been raised to the vessel is at a position where it can be gripped by the hold off clamp 18, enabling the winch line 22 and further connector components to be uncoupled from the end 2 of the pipe 1.

FIG. 14A furthermore illustrates the pennant wire 30 having been wound onto pennant reel 34, to be stored.

The portion of pipe 1 which was lying on the sea floor has thus been recovered to the vessel 100 and further pipe laying operations may thereafter be resumed, for example by joining a further section of pipe to be laid to the end 2 of the pipe 1 which has been raised from the sea floor.

In the foregoing examples of pipe abandonment and recovery operations, the effective length of the winch line 22 of the A&R winch 20 is extended by the length of the pennant wire 30, to enable the A&R capability of the vessel 100 to be extended to greater sea depths. In the above examples, it is contemplated for the winch line 22 of the A&R winch to have a length of approximately 3,000 meters, and for the effective working length to be extended by 1,000 meters or more through using the pennant wire 30. This allows the pipe laying vessel 100 to be operated in significantly greater sea depths.

Because the pennant wire 30 only has to carry the induced load of the end portion of the pipe 1 being raised or lowered at a substantial depth below the surface of the sea, and not near the sea surface where the loading is greater, the pennant wire 30 need not have as high a safe working load as the winch line 22 of the A&LR winch 20. The diameter of the wire for the extended distance beyond the effective length of the A&R winch line can thereby be reduced as compared with simply extending the length of the A&R winch line 22.

It is furthermore contemplated that, in order to increase the effective working depth of the vessel for A&R operations, two or more pennant wires of successively lower safe working loads could be used in series, each having a respective pennant end stop to allow each pennant wire to suspend the end portion of the pipe 1 at successively greater depths below the surface of the sea, from the stern of the vessel, in a chain. Such a system may allow the effective working load of the A&R winch to be increased, so as to accommodate the greater induced load of the end portion of the pipe being laid, and which must be raised or lowered, near the surface of the sea. Increasing the A&R winch capacity, of course, requires a correspondingly increased strength, thickness and weight of winch line for raising and lowering the end portion of the pipe near the sea surface. However, by utilizing one or more appropriate pennant wires 30, an appropriately reduced length of such a higher capacity winch wire 22 can be used, for lowering the end portion of the pipe 1 in stages to different predetermined depths at which the successive pennant wires in the chain are effective to suspend the end portion of the pipe 1 from the vessel 100.

A similar arrangement could be achieved by providing a longer pennant wire having not only a pennant end stop at the end thereof, for suspending the pennant wire from the vessel, but also including one or more intermediate pennant stops, by which the pennant wire can be suspended from the end stop holder 36 at the stern of vessel 100 at an intermediate position along its length. Such an arrangement would similarly allow raising and lowering of pipes, between the vessel on the surface of the sea and the sea floor, in successive stages, but only using one pennant wire.

In a similar manner, it is also contemplated that the system of using dual winching apparatuses of different capacities, for abandoning and recovering pipes between a vessel on the surface of the sea and the sea floor, of GB 2 434 627 A could be adapted for use with one or more pennant wires, in a similar manner as with the single A&R winch methods described above.

The apparatus and raising and lowering methods of the present invention accordingly enable abandonment and recovery to be carried out at depths beyond the length of the A&R winch line with which the vessel is provided. Indeed, it is therefore preferable that the depth to which the pipe is to be abandoned and recovered be greater than the length of the winch line of the A&R winch for the vessel being used, when carrying out the methods of the invention.

In the specific example of recovering a pipe lying on the sea floor back to the vessel on the sea surface, described above with reference to FIGS. 5A to 14B, an advantageous system for guiding a line to a component suspended below the surface of the sea, and for coupling the guided line to the component, are disclosed. Specifically, the use of snatch block 28 to guide the winch line 22 to the connector 40, and the subsequent use of connector hook 48 for coupling the A&R strop 26 to the connector body 42, thereby establishing connection between the winch line 22 and the connector 40, provide facile means by which to establish subsea interconnection between the A&R winch line 22 and the end 2 of the pipe 1 to be raised.

It will be apparent from the foregoing description that the pipe being laid or recovered has a length such that it extends at least from the sea floor to the floating vessel at the surface of the sea, and usually will extend some distance along the sea floor (the laid portion). The pipe extending from the sea floor to the vessel may be a continuous length of pipe, or may be formed from a plurality of joined sections of pipe.

What is claimed:

1. A method of positioning on a sea floor, from a floating vessel, an unlaid end portion of a pipe that is being laid from its other end on the sea floor, comprising the steps of:
    (i) lowering the unlaid end portion of the pipe from a lowering device on the vessel to a lowered position in a sea above the sea floor;
    (ii) transferring a load comprising the unlaid end portion of the pipe from the lowering device to a wire, cable or synthetic rope for suspending the unlaid end portion of the pipe at the lowered position in the sea; and
    (iii) lowering the wire, cable or synthetic rope for suspending and the unlaid end portion of the pipe suspended thereby to lower the unlaid end portion of the pipe to the sea floor by the lowering device.

2. The method of claim 1, wherein the wire, cable or synthetic rope for suspending is extendible from the vessel and having an extended length substantially the same as a depth of the lowered position.

3. The method of claim 2, comprising extending the wire, cable or synthetic rope from the vessel as the unlaid end portion of the pipe is lowered from the lowering device.

4. The method of claim 2, wherein the wire, cable or synthetic rope is extendible from a location on the vessel laterally spaced from the lowering device.

5. The method of claim 2, wherein the wire, cable or synthetic rope is structurally configured to be coupled to the vessel at one end thereof and coupled to the unlaid end of the pipe being laid at the other end thereof, and wherein the unlaid end of the pipe is suspended at the lowered position from the vessel.

6. The method of claim 2, wherein the wire, cable or synthetic rope is a pennant wire spooled on a winch, the method comprising unspooling the wire, cable or synthetic rope from the winch to extend from the vessel.

7. The method of claim 1, wherein an end connector is connected to the unlaid end of the pipe being laid by which to couple the lowering device to the unlaid end portion of the pipe for lowering the unlaid end portion of the pipe, the end connector including a swivel to allow relative axial rotation between the lowering device and the unlaid end of the pipe being laid, when coupled.

8. The method of claim 7, wherein the end connector is structurally configured to couple to the wire, cable or synthetic rope for suspending and to allow relative axial rotation between the wire, cable or synthetic rope for suspending and the unlaid end of the pipe being laid, when coupled.

9. The method of claim 1, wherein the lowering device on the vessel is a winch having a winch line for taking the load of, and lowering, the unlaid end portion of the pipe.

10. The method of claim 9, wherein the winch line has a length less than the depth of the sea floor, and the wire, cable or synthetic rope for suspending is provided to extend an effective length of the winch line to enable the winch to lower the unlaid end portion of the pipe to the sea floor.

11. A method of recovering to a floating vessel an end of a pipe lying on a sea floor, comprising the steps of:
    (i) lowering, to the end of the pipe to be recovered on the sea floor, a wire, cable or synthetic rope for suspending an end portion of the pipe to be recovered at a raised position in a sea above the sea floor, and coupling the wire, cable or synthetic rope for suspending to the end of the pipe;
    (ii) raising the wire, cable or synthetic rope for suspending with a raising device on the vessel to raise the end portion of the pipe to be recovered to the raised position in the sea and suspending the end portion of the pipe to be recovered at the raised position in the sea with the wire, cable or synthetic rope for suspending;
    (iii) transferring loading of the end portion of the pipe to be recovered from the wire, cable or synthetic rope for suspending to the raising device; and (iv) raising the end of the pipe to be recovered from the raised position in the sea to the vessel with the raising device.

12. The method of claim 11, wherein the wire, cable or synthetic rope for suspending is configured to be coupled at one end to the end to the pipe to be recovered and at the other end to the vessel, and wherein the end portion of the pipe to be recovered is suspended at the raised position from the vessel.

13. The method of claim 11, wherein the raising device is a winch having a winch line.

14. The method of claim 11, wherein after suspending the end portion of the pipe to be recovered at the raised position, the method comprises:
    directing a coupling device for coupling the raising device to the end of the pipe to the end of the pipe along the wire, cable or synthetic rope for suspending, and
    coupling the raising device to the end of the pipe, before the step of transferring loading of the end portion of the pipe to be recovered from the wire, cable or synthetic rope for suspending to the raising device.

15. The method of claim 14, wherein the step of directing the coupling device comprises directing the coupling device along the wire, cable or synthetic rope for suspending to a position lateral of the vessel beyond the operative range of a remotely operated vehicle (ROV) lateral of the vessel.

16. The method of claim 14, wherein the step of directing the coupling device comprises directing the coupling device along the wire, cable or synthetic rope for suspending to a position lateral of the vessel by a distance greater than 10 m.

17. The method of claim 11, comprising uncoupling the wire, cable or synthetic rope for suspending from the end of the pipe after the loading of the end portion of the pipe has been transferred to the raising device.

18. The method of claim 11, comprising recovering the wire, cable or synthetic rope for suspending to the vessel after the loading of the end portion of the pipe has been transferred to the raising device.

19. The method of claim 18, wherein the step of recovering the wire, cable or synthetic rope for suspending comprises winding it onto a reel.

20. The method of claim 18, comprising using a remotely operated vehicle (ROV) for effecting coupling to and uncoupling from the end of the pipe, below the surface of the sea.

21. The method of claim 18, further including repositioning the vessel on the surface of the sea in accordance with changes in the depth of the end portion of the pipe.

22. The method of claim 18, further including laterally repositioning the wire, cable or synthetic rope for suspending on the vessel between a hang-off position in which the pipe is suspended from the vessel by the line for suspending and a storage position where the wire, cable or synthetic rope for suspending is stored on the vessel.

23. The method of claim 22, comprising using a crane on the vessel for laterally repositioning the wire, cable or synthetic rope for suspending.

24. Apparatus for use in either positioning on the sea floor, from a floating vessel, an unlaid end portion of a pipe that is being laid from its other end on the sea floor or recovering to a floating vessel the end of a pipe laying on the sea floor, comprising:
    (i) a winch and winch line for raising and lowering the end portion of the pipe to or from the vessel;
    (ii) a pennant wire for suspending the end portion of the pipe from the vessel, and able to be interposed between the end of the winch line and the end of the pipe to extend the effective length of the winch line;
    (iii) a connector configured to be coupled to the end of the pipe and to releasably couple to each of the winch line and the pennant wire, and wherein the winch line of the winch for raising or lowering the end portion of the pipe to or from the vessel is not long enough to reach from the vessel to the sea floor, and the pennant wire is utilized to extend the effective length of the winch line so as to reach from the vessel to the sea floor.

25. The apparatus according to claim 24, further comprising a remotely operated vehicle (ROV) for coupling the connector to one or more of the end of the pipe, the winch line and the pennant wire.

26. The apparatus according to claim 24, further comprising a reel onto which the pennant wire may be wound.

27. The apparatus according to claim 24, further comprising a snatch block by which the winch line is lowered to the connector coupled to the end of the pipe, by lowering the snatch block along the pennant wire, when the end of the pipe is coupled to the pennant wire and suspended thereby from the vessel.

28. The apparatus according to claim 27, wherein the snatch block is configured to be lowered along the pennant wire to a distance astern of the vessel greater than the operative range of an ROV astern of the vessel.

29. The apparatus according to claim 27, wherein the snatch block is configured to be lowered along the pennant wire astern of the vessel by a distance greater than 10 m.

30. The apparatus according to claim 24, wherein the pennant wire includes an end stop, at one end thereof, by which the pennant wire may be hung from a hang-off point on the vessel for thereby suspending the end portion of the pipe from the vessel by the pennant wire.

31. The apparatus according to claim 24, wherein the connector includes a body and a coupling for each of the end of the pipe, the winch line and the pennant wire, and wherein at least the couplings for winch line and the pennant line are rotatable relative to the body about axes mutually perpendicular to the axes of the pipe, winch line and pennant wire, when all three are coupled to the connector.

32. The apparatus according to claim 24, wherein the connector includes a swivel to allow relative rotation, substantially about the axis of the pipe, between the pipe and either or both of the winch line and pennant wire, when respectively coupled to the connector.

* * * * *